United States Patent
Zhou et al.

(10) Patent No.: US 12,047,161 B2
(45) Date of Patent: Jul. 23, 2024

(54) MAPPING A CONTROL RESOURCE TO A PHYSICAL CELL

(71) Applicant: QUALCOMM Incorporated, San Diego, CA (US)

(72) Inventors: Yan Zhou, San Diego, CA (US); Qian Zhang, Basking Ridge, NJ (US); Mostafa Khoshnevisan, San Diego, CA (US); Sony Akkarakaran, Poway, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/242,032

(22) Filed: Apr. 27, 2021

(65) Prior Publication Data

US 2021/0344436 A1  Nov. 4, 2021

Related U.S. Application Data

(60) Provisional application No. 63/018,279, filed on Apr. 30, 2020.

(51) Int. Cl.
*H04W 72/12* (2023.01)
*H04J 11/00* (2006.01)
*H04W 72/23* (2023.01)

(52) U.S. Cl.
CPC ......... *H04J 11/0079* (2013.01); *H04W 72/23* (2023.01); *H04J 11/0093* (2013.01); *H04J 2211/005* (2013.01)

(58) Field of Classification Search
CPC ............... H04J 11/0053; H04J 11/0069; H04J 11/0079; H04J 11/0093; H04J 2211/005;
(Continued)

(56) References Cited

U.S. PATENT DOCUMENTS 11,641,647 B2   5/2023  Zhang et al.
2013/0083744 A1* 4/2013 Peng ............... H04W 52/0235
                                                   370/329
(Continued)

FOREIGN PATENT DOCUMENTS

WO  WO-2020069415 A1  4/2020
WO  2021146744 A1     7/2021

OTHER PUBLICATIONS

Huawei, et al., "Remaining Issues and TP on Interleaved CCE-to-REG Mapping", 3GPP Draft, 3GPP TSG RAN WG1 Meeting #92, R1-1802683, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398116, 5 Pages, Retrieved from the Internet: URL: http://www.3gpp.org/ftp/tsg%5Fran/WG1%5FRL1/TSGR1%5F92/Docs/. [Retrieved on Feb. 17, 2018] sections 1-3.
(Continued)

*Primary Examiner* — Mansour Oveissi
(74) *Attorney, Agent, or Firm* — Holland & Hart LLP

(57) ABSTRACT

Methods, systems, and devices for wireless communications are described to enable one or both of a base station or a user equipment (UE) to identify one or more physical cell identifiers (PCIs) for a scheduled communication, using an association between the one or more PCIs and a control resource set (CORESET), for example, used to transmit a grant scheduling the communication. The base station may identify a mapping between one or more PCIs associated with a communication and may transmit, to the UE, a grant scheduling the communication on a CORESET associated with the one or more PCIs. The UE may identify a mapping between the CORESET and the one or more PCIs associated with the communication based on receiving the grant in the CORESET. The UE and the base station may communicate (Continued)

a message scheduled by the grant using parameters associated with the one or more identified PCIs.

28 Claims, 18 Drawing Sheets

(58) Field of Classification Search
CPC ... H04L 5/0007; H04L 5/0035; H04L 5/0053; H04L 5/0091; H04W 72/042; H04W 72/1289; H04W 72/14
See application file for complete search history.

(56) References Cited

U.S. PATENT DOCUMENTS

| | | | |
|---|---|---|---|
| 2018/0070247 A1* | 3/2018 | Gormley | H04W 36/0061 |
| 2021/0075537 A1* | 3/2021 | Fröberg Olsson | H04W 72/53 |
| 2021/0329512 A1* | 10/2021 | Jassal | H04W 36/0058 |
| 2022/0116181 A1* | 4/2022 | Lin | H04L 27/0006 |
| 2022/0132517 A1* | 4/2022 | Zhu | H04L 5/0023 |
| 2023/0087223 A1* | 3/2023 | Jang | H04L 1/08 370/329 |

OTHER PUBLICATIONS

Huawei, et al., "Summary of Remaining Issues on PDCCH Structure", 3GPP Draft, 3GPP TSG RAN WG1 Ad Hoc Meeting, R1-1800067, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051384570, 4 Pages, Retrieved from the Internet: URL: http://www.3gpp.org/ftp/tsg%5Fran/WG1%5FRL1/TSGR1%5FAH/NR%5FAH%5F1801/Docs/. [Retrieved on Jan. 13, 2018] sections 1-4.
International Search Report and Written Opinion—PCT/US2021/029626—ISA/EPO—Aug. 5, 2021 (204342WO) .

* cited by examiner

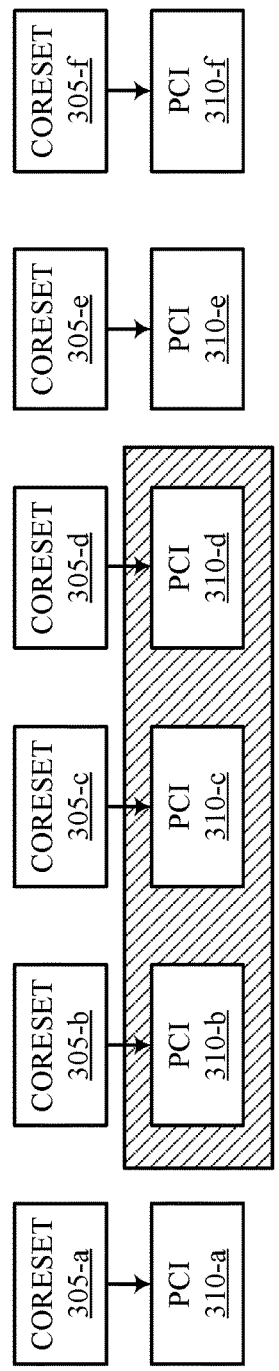
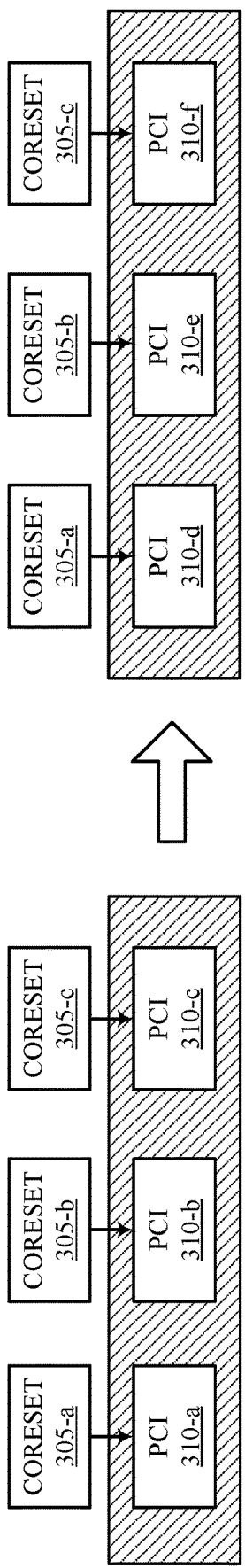
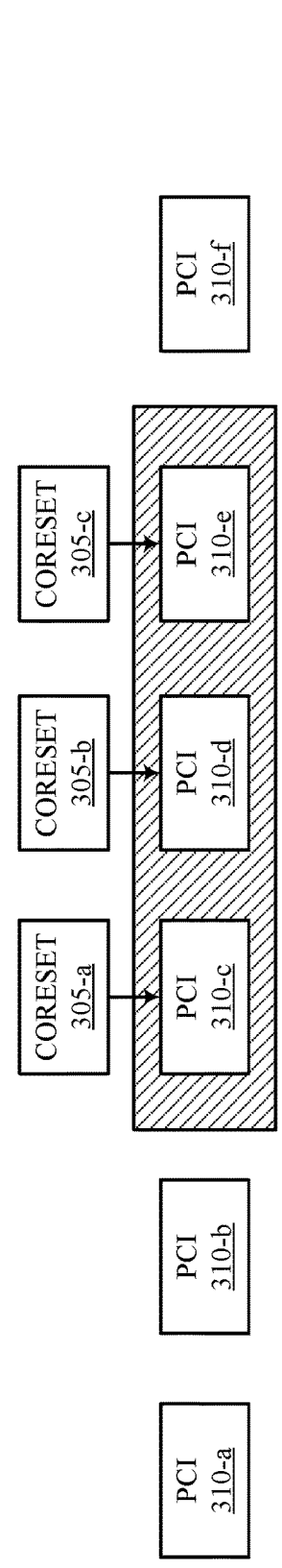
FIG. 3A
FIG. 3B
FIG. 3C

MAPPING A CONTROL RESOURCE TO A PHYSICAL CELL

CROSS REFERENCE

The present Application for Patent claims the benefit of U.S. Provisional Patent Application No. 63/018,279 by ZHOU et al., entitled "MAPPING A CONTROL RESOURCE TO A PHYSICAL CELL," filed Apr. 30, 2020, assigned to the assignee hereof, and expressly incorporated by reference herein.

FIELD OF TECHNOLOGY

The following relates generally to wireless communications and more specifically to mapping a control resource to a physical cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with multiple candidate cells for communications with one or more base stations of a wireless communications network. The UE may be configured to communicate with a subset of the candidate cells at a time, and in some cases, may be unaware of communication parameters for a message communicated via one or more of the subset of the candidate cells.

SUMMARY

The described techniques relate to improved methods, systems, devices, and apparatuses that support mapping a control resource to a physical cell. Generally, the described techniques provide for one or both of a base station or a user equipment (UE) to identify one or more physical cell identifiers (PCIs) for a scheduled communication, for example, using an association between the one or more PCIs and a control resource set (CORESET) used to transmit a grant scheduling the communication. The association may be explicitly signaled to the UE by the base station, or may be based on an implicit rule (e.g., a predefined rule, such as a rule defined in a wireless communications standard or previously configured at a device such as the UE). The association may be an association between the CORESET and the one or more PCIs or between a search space for the CORESET and the one or more PCIs. In some cases, the association may include an association between the one or more PCIs and a pool index of the CORESET or a pool index of a search space for the CORESET. The association may change based on one or more active PCIs associated with communications between the UE and the base station or may be independent of the one or more active PCIs. As described herein, a CORESET, a search space, or a PCI may respectively represent one or more CORESETs, one or more search spaces, or one or more PCIs without departing from the scope of the present disclosure.

The base station may identify a mapping between one or more PCIs associated with a communication (e.g., an uplink or downlink message). The base station may transmit a grant scheduling the communication via a CORESET (e.g., in a corresponding search space) associated with the one or more PCIs, and the UE may receive the grant via the CORESET. The UE may identify a mapping between the CORESET (e.g., or associated search space) and the one or more PCIs associated with the communication, based on receiving the grant via the CORESET. Based on the one or more PCIs, the UE may receive the downlink message scheduled by the grant or may transmit the uplink message scheduled by the grant, for example, using one or more parameters associated with the one or more identified PCIs. Similarly, the base station may transmit the downlink message scheduled by the grant or may receive the uplink message scheduled by the grant using one or more parameters associated with the one or more PCIs.

A method of wireless communication at a UE is described. The method may include receiving, from a base station via one or more CORESETs of one or more search spaces, a control message scheduling a communication between the UE and the base station, identifying, based on receiving the control message, an association between the one or more CORESETs of the one or more search spaces and one or more PCIs, and communicating, based on the association between the one or more CORESETs and the one or more PCIs, with the base station according to one or more parameters associated with the one or more PCIs.

An apparatus for wireless communication at a UE is described. The apparatus may include a processor, memory coupled with the processor, and instructions stored in the memory. The instructions may be executable by the processor to cause the apparatus to receive, from a base station via one or more CORESETs of one or more search spaces, a control message scheduling a communication between the UE and the base station, identify, based on receiving the control message, an association between the one or more CORESETs of the one or more search spaces and one or more PCIs, and communicate, based on the association between the one or more CORESETs and the one or more PCIs, with the base station according to one or more parameters associated with the one or more PCIs.

Another apparatus for wireless communication at a UE is described. The apparatus may include means for receiving, from a base station via one or more CORESETs of one or more search spaces, a control message scheduling a communication between the UE and the base station, identifying, based on receiving the control message, an association between the one or more CORESETs of the one or more search spaces and one or more PCIs, and communicating, based on the association between the one or more CORESETs and the one or more PCIs, with the base station according to one or more parameters associated with the one or more PCIs.

A non-transitory computer-readable medium storing code for wireless communication at a UE is described. The code may include instructions executable by a processor to receive, from a base station via one or more CORESETs of one or more search spaces, a control message scheduling a communication between the UE and the base station, identify, based on receiving the control message, an association between the one or more CORESETs of the one or more search spaces and one or more PCIs, and communicate, based on the association between the one or more CORESETs and the one or more PCIs, with the base station according to one or more parameters associated with the one or more PCIs.

A method of wireless communication at a base station is described. The method may include identifying an association between one or more CORESETs of one or more search spaces and one or more PCIs for communications with a UE, transmitting, to the UE via the one or more CORESETs of the one or more search spaces and based on identifying the association, a control message scheduling a communication between the UE and the base station, and communicating, based on the association between the one or more CORESETs and the one or more PCIs, with the UE according to one or more parameters associated with the one or more PCIs.

An apparatus for wireless communication at a base station is described. The apparatus may include a processor, memory coupled with the processor, and instructions stored in the memory. The instructions may be executable by the processor to cause the apparatus to identify an association between one or more CORESETs of one or more search spaces and one or more PCIs for communications with a UE, transmit, to the UE via the one or more CORESETs of the one or more search spaces and based on identifying the association, a control message scheduling a communication between the UE and the base station, and communicate, based on the association between the one or more CORESETs and the one or more PCIs, with the UE according to one or more parameters associated with the one or more PCIs.

Another apparatus for wireless communication at a base station is described. The apparatus may include means for identifying an association between one or more CORESETs of one or more search spaces and one or more PCIs for communications with a UE, transmitting, to the UE via the one or more CORESETs of the one or more search spaces and based on identifying the association, a control message scheduling a communication between the UE and the base station, and communicating, based on the association between the one or more CORESETs and the one or more PCIs, with the UE according to one or more parameters associated with the one or more PCIs.

A non-transitory computer-readable medium storing code for wireless communication at a base station is described. The code may include instructions executable by a processor to identify an association between one or more CORESETs of one or more search spaces and one or more PCIs for communications with a UE, transmit, to the UE via the one or more CORESETs of the one or more search spaces and based on identifying the association, a control message scheduling a communication between the UE and the base station, and communicate, based on the association between the one or more CORESETs and the one or more PCIs, with the UE according to one or more parameters associated with the one or more PCIs.

BRIEF DESCRIPTION OF THE DRAWINGS

FIGS. 3A, 3B, and 3C illustrate respective examples of mapping configurations that support mapping a control resource to a physical cell in accordance with aspects of the present disclosure.

DETAILED DESCRIPTION

Figure 1:
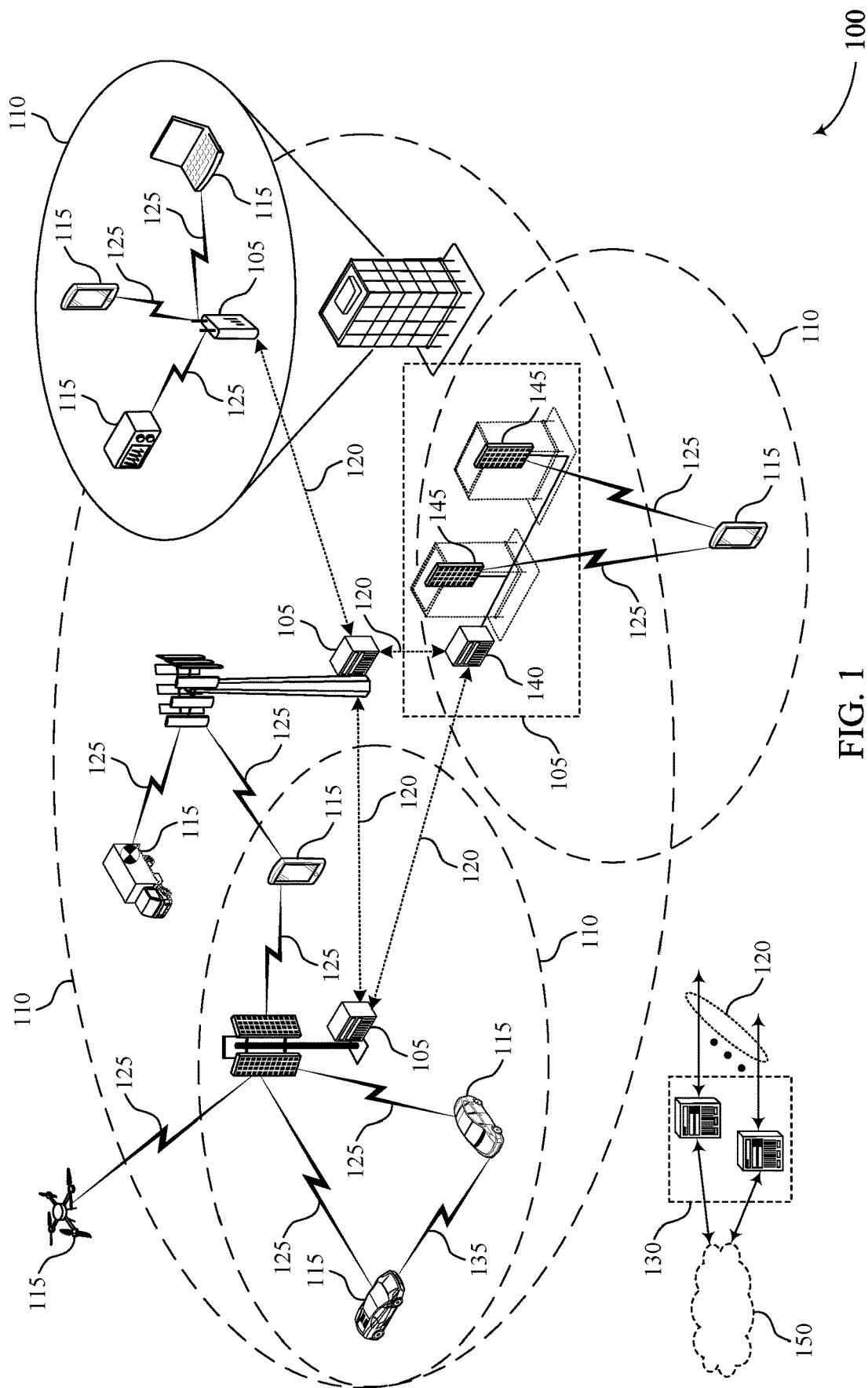
FIG. 1 illustrates an example of a wireless communications system that supports mapping a control resource to a physical cell in accordance with aspects of the present disclosure.

In a wireless communications system, a user equipment (UE) may communicate with one or more transmission and reception points (TRPs), one or more serving cells, or combinations thereof, which may be described herein as examples of physical cells used for wireless communications. The one or more TRPs or one or more serving cells, or both, may be associated with or otherwise correspond to a base station (e.g., or one or more base stations). The one or more TRPs or serving cells, or both, may also each be associated with a corresponding physical cell identifier (PCI), where the PCIs may be provided by the base station to the UE in some examples. The wireless communications system may support some techniques for inter-cell mobility, such that one or more different PCIs and corresponding physical cells (e.g., TRPs, serving cells) may be used at different times to increase coverage, reliability, and throughput.

A PCI (e.g., corresponding to a TRP or a serving cell) may correspond to one or more communication parameters for the respective TRP or serving cell. For example, a PCI may be associated with a transmission configuration indicator (TCI) state, a bit scrambling technique, a rate matching pattern, one or more beam parameters, other aspects, or any combination thereof. In some cases, the base station may transmit a grant scheduling a communication (e.g., a downlink or uplink message) for the UE, where the communication may correspond to one or more TRPs or one or more serving cells (e.g., each associated with a PCI and corresponding communication parameters). If the UE is not aware of (e.g., has not determined) which PCI and corresponding communication parameters are associated with the scheduled transmission, the communication may experience reduced communication quality, or the UE may be unable to transmit or receive the communication. In some cases, indicating a PCI for the communication (e.g., via a grant scheduling the communication or via another transmission), may increase overhead, or communication delays, or both.

The present disclosure provides techniques for the base station or the UE (or both) to identify one or more PCIs for a scheduled communication using an association between the one or more PCIs and a control resource set (CORESET), for example, used to transmit a grant scheduling the communication. The association may be explicitly signaled to the UE by the base station or may be based on an implicit rule (e.g., a predefined rule, such as a rule defined in a wireless communications standard or previously configured at a device such as the UE). The association may be an association between the CORESET and the one or more PCIs or between a search space for the CORESET and the one or more PCIs. In some cases, the association may include an association between the one or more PCIs and a pool index of the CORESET or a pool index of a search space for the CORESET. The association may change based on one or more active PCIs associated with communications between the UE and the base station, or may be independent of the one or more active PCIs. As described herein, a CORESET, a search space, or a PCI may respectively represent one or more CORESETs, one or more search spaces, or one or more PCIs without departing from the scope of the present disclosure.

The base station may identify a mapping between one or more PCIs associated with a communication (e.g., an uplink or downlink message). The base station may transmit a grant scheduling the communication via a CORESET (e.g., in a corresponding search space) associated with the one or more PCIs and the UE may receive the grant via the CORESET. The UE may identify a mapping between the CORESET (e.g., or associated search space) and the one or more PCIs associated with the communication, based on receiving the grant via the CORESET. Based on the one or more PCIs, the UE may receive the downlink message scheduled by the grant or may transmit the uplink message scheduled by the grant, for example, using one or more parameters associated with the one or more identified PCIs. Similarly, the base station may transmit the downlink message scheduled by the grant or may receive the uplink message scheduled by the grant using one or more parameters associated with the one or more PCIs.

Aspects of the disclosure are initially described in the context of wireless communications systems. Aspects of the disclosure are further illustrated by and described with reference to mapping configuration, a process flow, apparatus diagrams, system diagrams, and flowcharts that relate to mapping a control resource to a physical cell.

FIG. 1 illustrates an example of a wireless communications system 100 that supports mapping a control resource to a physical cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may communicate with one or more base stations 105 via one or more TRPs and/or one or more serving cells. A PCI (e.g., corresponding to a TRP or a serving cell) may correspond to one or more communication parameters for the respective TRP or serving cell. For example, a PCI may be associated with a TCI state, a bit scrambling technique, a rate matching pattern, one or more beam parameters, or any combination thereof, used for communications with the corresponding TRP or serving cell. A base station 105 and a UE 115 may identify one or more PCIs for a scheduled communication using an association between the one or more PCIs and a CORESET used to transmit a grant scheduling the communication.

For example, the base station 105 may identify a mapping between one or more PCIs associated with a communication (e.g., an uplink or downlink message). The base station 105 may transmit a grant scheduling the communication via a CORESET (e.g., in a corresponding search space) associated with the one or more PCIs and the UE 115 may receive the grant via the CORESET. The UE 115 may identify a mapping between the CORESET (e.g., or associated search space) and the one or more PCIs associated with the communication, based on receiving the grant via the CORESET. Based on the one or more PCIs, the UE 115 may receive the downlink message scheduled by the grant or may transmit the uplink message scheduled by the grant, for example, using one or more parameters associated with the one or more identified PCIs. Similarly, the base station 105 may transmit the downlink message scheduled by the grant or may receive the uplink message scheduled by the grant using one or more parameters associated with the one or more PCIs.

Figure 2:
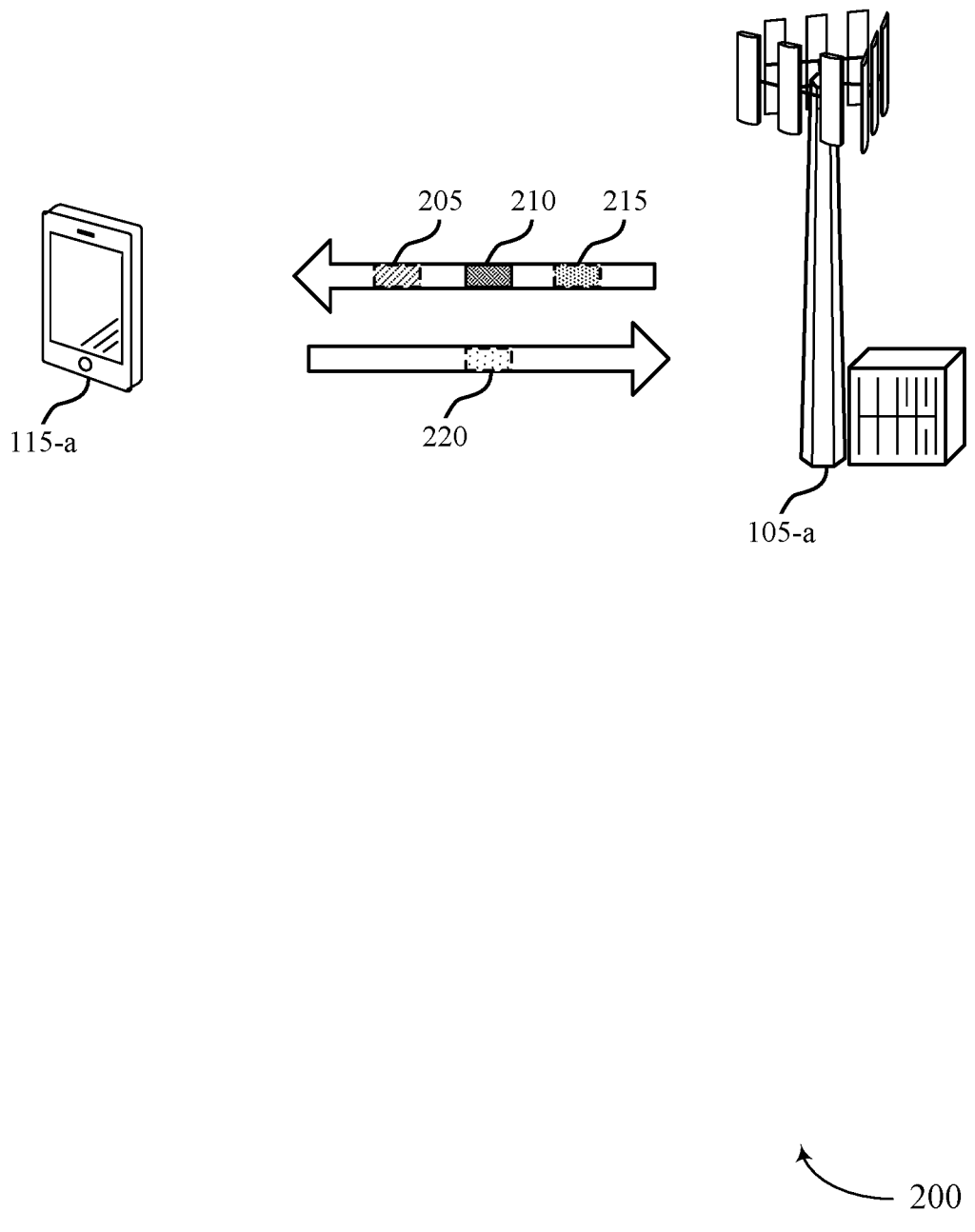
FIG. 2 illustrates an example of a wireless communications system that supports mapping a control resource to a physical cell in accordance with aspects of the present disclosure.

FIG. 2 illustrates an example of a wireless communications system 200 that supports mapping a control resource to a physical cell in accordance with aspects of the present disclosure. In some examples, the wireless communications system 200 may implement aspects of wireless communications system 100. The wireless communications system 200 may include UE 115-a, which may be an example of a UE 115 described with reference to FIG. 1. UE 115-a may communicate with one or more TRPs, one or more serving cells, or combinations thereof. The one or more TRPs and/or one or more serving cells may be examples of a small cell as described herein (e.g., among other examples), and may be associated with one or more base stations 105 as described with reference to FIG. 1. For example, the one or more TRPs and/or one or more serving cells may be associated with or otherwise correspond to base station 105-a (e.g., among other base stations 105), which may be an example of a base station 105 described with reference to FIG. 1.

UE 115-a may be configured to communicate with base station 105-a via one or more cells (e.g., serving cells or TRPs) and may receive an indication of a set of PCIs corresponding to the one or more cells. In some cases, the PCIs may be provided by a base station 105, such as base station 105-a. In some cases, one or more TRPs may be distributed in the wireless communications system 200 and may provide one or more cells for UE 115-a (e.g., for communications with at least base station 105-a). The wireless communications system 200 may support some techniques for inter-cell mobility, such as Layer 1 (L1) and Layer 2 (L2) based inter-cell mobility. In some examples, L1 may refer to the physical layer, and L2 may refer to the MAC, RLC, and/or PDCP layer.

L1 or L2 based inter-cell mobility may include multiple modes for communications between base station 105-a and UE 115-a. In a first mode of inter-cell mobility, a serving cell (e.g., each serving cell) may be associated with multiple TRPs, which may have different locations. In the first mode, each TRP may have a different PCI, where the PCI for a TRP may be carried by a synchronization signal block (SSB) transmitted by the TRP. UE 115-a may be served by a subset of a serving cell's TRPs (e.g., a subset of TRPs of a serving cell of base station 105-a), which subset may be indicated by corresponding PCI values and may be modified by base station 105-a (e.g., or another associated base station 105) via a control message (e.g., a downlink control information (DCI) message or a MAC control element (CE)). As an example of the first mode, UE 115-a may communicate with base station 105-a via one serving cell associated with a first TRP and a second TRP. The TRPs may provide corresponding PCIs (e.g., active PCIs) for UE 115-a, which may respectively be indicated to UE 115-a via an SSB transmitted from a respective TRP. UE 115-a may receive the SSBs, identify the PCIs for the first and second TRPs, respectively, and may communicate with base station 105-a based on the PCIs for the first and/or second TRPs.

In a second mode of inter-cell mobility, UE 115-a may be configured for communication with a group of serving cells (e.g., candidate serving cells) where a single PCI corresponds to a single serving cell. For example, UE 115-a may be configured with a group of serving cells for communications with base station 105-a, where each of the serving cells may have a different PCI. UE 115-a may be configured to measure L1 metrics for a serving cell (e.g., for each respective serving cell) in the group. For example, the UE 115 may measure an L1 reference signal received power (RSRP), signal plus interference to noise ratio (SINR), reference signal received quality (RSRQ), or other L1 characteristic metric(s), for each candidate serving cell. In the second mode, UE 115-a may be served by a subset of the group of serving cells, which subset may be indicated by corresponding PCI values and may be modified by base station 105-a (e.g., or another associated base station 105) via a control message (e.g., a DCI or a MAC CE). Base station 105-a (e.g., providing the serving cells) may determine the subset of serving cells based on an L1 report from UE 115-a, which, for example, UE 115-a may transmit to a selected serving cell or to an anchor serving cell in the group of serving cells.

As an example of the second mode, UE 115-a may communicate with base station 105-a via one or more serving cells of a group of serving cells provided by base station 105-a. For example, base station 105-a may provide, for UE 115-a, a first serving cell associated with a first PCI and a second serving cell associated with a second PCI. UE 115-a may perform measurements on the serving cells provided by base station 105-a and report the measurements to base station 105-a. Base station 105-a may select at least some of the serving cells, such as a subset of the serving cells, based on the report and configure the selected serving cells as active serving cells for UE 115-a. In some examples, multiple TRPs may provide the serving cells of the group of serving cells. For example, a first TRP may provide one or more serving cells and a second TRP may provide one or more serving cells.

A PCI (e.g., corresponding to a TRP or a serving cell) may correspond to one or more communication parameters for the respective TRP or serving cell. For example, a PCI may be associated with a TCI state for the PCI, a bit scrambling technique for a shared channel (e.g., a physical downlink shared channel (PDSCH) or a physical uplink shared channel (PUSCH)), a rate matching pattern for a shared channel, one or more beam parameters, or any combination thereof. In some cases, base station 105-a may transmit a grant 210 scheduling a communication (e.g., downlink message 215 or uplink message 220) for UE 115-a, where the communication may correspond to one or more TRPs or one or more serving cells (e.g., each associated with an indicated PCI and corresponding communication parameters). If UE 115-*a* is not aware of which PCI (e.g., of the active PCIs for UE 115-*a*) and corresponding communication parameters are associated with the scheduled transmission, the communication may experience reduced communication quality or UE 115-*a* may be unable to transmit or receive the communication. In some cases, indicating a PCI for the communication (e.g., via a grant scheduling the communication or via another transmission), may increase overhead or communication delays, or both, among other issues.

The present disclosure provides techniques for one or both of base station 105-*a* or UE 115-*a* to identify one or more PCIs for a scheduled communication using an association between the one or more PCIs and a CORESET used to communicate a grant 210 scheduling the communication. The association may be explicitly signaled to UE 115-*a* by base station 105-*a* via a message 205 (e.g., an RRC, DCI, or MAC CE message), or may be based on an implicit rule (e.g., a predefined rule, such as a rule defined in a wireless communications standard or previously configured at a device such as UE 115-*a* or base station 105-*a*). The association may be an association between the CORESET and the one or more PCIs or between a search space for the CORESET and the one or more PCIs. In some cases, the association may include an association between the one or more PCIs and a pool index of the CORESET or a pool index of a corresponding search space. The association may change based on one or more active PCIs associated with communications between UE 115-*a* and base station 105-*a*, or may be independent of one or more active PCIs.

In a first example, base station 105-*a* may transmit an RRC, DCI or MAC CE message (e.g., message 205) to UE 115-*a*, which may explicitly indicate a mapping or association between the one or more PCIs and the CORESET. The mapping or association may include an association between one or more respective PCIs and each CORESET of a group of CORESETs for communications between UE 115-*a* and base station 105-*a*, an association between one or more respective PCIs and each search space of a group of search spaces for communications between UE 115-*a* and base station 105-*a*, or any combination thereof. In some cases, the message 205 may indicate an association or mapping between the one or more respective PCIs and a pool index of each CORESET of the group of CORESETs, an association or mapping between the one or more respective PCIs and a pool index of each search space of the group of search spaces, or any combination thereof. In some cases, the mapping may change with an active subset of PCIs. For example, if base station 105-*a* indicates new or different active PCIs to UE 115-*a* (e.g., via a message), base station 105-*a* may also update the mapping of the PCIs to respective CORESETs and/or search spaces.

In a second example, base station 105-*a* and UE 115-*a* may determine an association or a mapping of PCIs to CORESETs or search spaces, or both, based on an implicit rule, such as a rule defined (e.g., predefined) by a wireless communications standard. The rule, for example, may be preconfigured or otherwise stored at the UE 115-*a* and the base station 105-*a*. The mapping indicated by the rule may include an association between one or more respective PCIs and each CORESET of a group of CORESETs for communications between UE 115-*a* and base station 105-*a*, an association between one or more respective PCIs and each search space of a group of search spaces for communications between UE 115-*a* and base station 105-*a*, or any combination thereof. In some cases, the mapping indicated by the rule may indicate an association or mapping between the one or more respective PCIs and a pool index of each CORESET of the group of CORESETs, an association or mapping between the one or more respective PCIs and a pool index of each search space of the group of search spaces, or any combination thereof. In some cases, the mapping may change with an active subset of PCIs.

In various examples, base station 105-*a* may identify a mapping between one or more PCIs associated with a communication (e.g., an uplink message 220 or a downlink message 215). In some cases, more than one PCI may be associated with a communication, for example, if the communication involves multiple TRPs or other communication entities. Base station 105-*a* may transmit a grant 210 scheduling the communication via a CORESET (e.g., in a corresponding search space) associated with the one or more PCIs and UE 115-*a* may receive the grant 210 via the CORESET. UE 115-*a* may identify a mapping between the CORESET (e.g., or associated search space) and the one or more PCIs associated with the communication, based on receiving the grant 210 via the CORESET. Based on the one or more PCIs, UE 115-*a* may receive the downlink message 215 scheduled by the grant 210 or may transmit the uplink message 220 scheduled by the grant 210, for example, using one or more parameters associated with the one or more PCIs. Similarly, base station 105-*a* may transmit the downlink message 215 scheduled by the grant 210 or may receive the uplink message 220 scheduled by the grant 210 using one or more parameters associated with the one or more PCIs.

FIGS. 3A, 3B, and 3C illustrate respective examples of mapping configurations 301, 302, and 303 that support mapping a control resource to a physical cell in accordance with aspects of the present disclosure. In some examples, mapping configurations 301, 302, and 303 may implement or be implemented by aspects of wireless communications system 100 or 200. For example, a base station 105 (e.g., or one or more base stations 105) or a UE 115, or both, may use aspects of mapping configuration 301, 302, or 303 to identify a mapping or an association between one or more PCIs 310 and a CORESET 305 used to communicate a grant. The base station 105 and the UE 115 may respectively represent examples of a base station 105 and a UE 115 described with reference to FIGS. 1 and 2. While the examples described herein describe mapping one or more PCIs 310 to a CORESET 305, the same examples may apply to mapping one or more PCIs 310 to a search space including the CORESET 305, mapping one or more PCIs 310 to a pool index of the CORESET 305, mapping one or more PCIs 310 to a pool index of a search space including the CORESET 305, or any combination thereof.

In a first example illustrated by FIG. 3A, the UE 115 or the base station 105, or both, may identify a mapping or an association between one or more PCIs 310 and a CORESET 305 used to communicate a grant based on a semi-static mapping that may not change when different PCIs 310 are activated or deactivated (e.g., for communications between the UE 115 and the base station 105). The base station 105 may configure and transmit the mapping to the UE 115 (e.g., in a table, such as via an RRC configuration, a DCI message, or a MAC CE), where the mapping may indicate an association between one or more PCIs 310 and one or more CORESETs 305 configured for communications between the UE 115 and the base station 105. In some cases, the mapping may be active for a duration of a communication link between the base station 105 and the UE 115, or may be active until a new mapping is configured and transmitted. The base station 105 may also indicate to the UE 115 one or more active PCIs 310 corresponding to one or more corresponding active serving cells and/or TRPs for communications between the UE 115 and the base station 105. In one example, PCIs 310-b, 310-c, and 310-d may be active and PCIs 310-a through 310-f may be included in a mapping transmitted from the base station 105 to the UE 115 (e.g., where PCIs 310-a, 310-e, and 310-f may be inactive). The mapping may associate each of PCIs 310-a through 310-f with a respective CORESET 305 from CORESETs 305-a through 305-f.

The base station 105 may transmit a grant scheduling a communication (e.g., an uplink or downlink transmission) to the UE 115 using a CORESET 305 associated with an active PCI 310. For example, the base station 105 may transmit the grant via CORESET 305-b. The UE 115 may receive the grant scheduling the communication (e.g., via CORESET 305-b) and may determine that the PCI 310 associated with the scheduled communication is the PCI 310 associated with CORESET 305-b via the mapping (e.g., PCI 310-b). The UE 115 and the base station 105 may communicate via the serving cell or TRP associated with PCI 310-b, for example, using one or more parameters associated with PCI 310-b. As described with reference to FIG. 2, the one or more parameters may include a TCI state, a bit scrambling technique for a shared channel carrying the communication, a rate matching pattern for a shared channel carrying the communication, one or more beam parameters, or any combination thereof. The base station 105 may, in some cases, change or modify active PCIs 310, where the mapping may remain the same for the changed or new active PCIs 310.

In a second example illustrated by FIG. 3B, the UE 115 or the base station 105 or both may identify a mapping or an association between one or more PCIs 310 and a CORESET 305 used to communicate a grant, based on a dynamic mapping that may change when different PCIs 310 are activated or deactivated (e.g., for communications between the UE 115 and the base station 105). The base station 105 may configure and transmit the mapping to the UE 115 via an RRC, DCI, or MAC CE message, where the mapping may indicate an association between one or more PCIs 310 and one or more CORESETs 305 configured for communications between the UE 115 and the base station 105. The base station 105 may also indicate to the UE 115 one or more active PCIs 310 corresponding to one or more corresponding active serving cells and/or TRPs for communications between the UE 115 and the base station 105.

In some cases, PCIs 310-a, 310-b, and 310-c may be active during a first time duration and may be respectively associated with CORESETs 305-a, 305-b, and 305-c via a first mapping transmitted by the base station 105. The base station 105 may change the active PCIs 310 at a beginning of a second time duration and may, for example, indicate to the UE 115 that PCIs 310-d, 310-e, and 310-f are active for communications (e.g., and that PCIs 310-a, 310-b, and 310-c are no longer active). The base station 105 may also indicate a new mapping, which may associate CORESETs 305-a, 305-b, and 305-c, respectively, with PCIs 310-d, 310-e, and 310-f (e.g., among other PCI 310 and CORESET 305 associations). In some cases, the base station 105 may transmit the new or updated mapping to the UE 115 together with the indication of the new or changed active PCIs 310 (e.g., within a message including or associated with an indication of a cell change or reselection). The base station 105 may transmit the updated mapping to the UE 115 via RRC signaling, a DCI, or a MAC CE.

The base station 105 may transmit a grant scheduling a communication (e.g., an uplink or downlink transmission) to the UE 115 using a CORESET 305 associated with an active PCI 310. For example, the base station 105 may transmit the grant via CORESET 305-b during the second time duration. The UE 115 may receive the grant scheduling the communication (e.g., via CORESET 305-b) and may determine that the PCI 310 associated with the scheduled communication is the PCI 310 associated with CORESET 305-b via the mapping (e.g., PCI 310-e). The UE 115 and the base station 105 may communicate via the serving cell or TRP associated with PCI 310-e, for example, using one or more parameters associated with PCI 310-e.

In a third example illustrated by FIG. 3C, the UE 115 or the base station 105, or both, may identify a mapping or an association between one or more PCIs 310 and a CORESET 305 used to communicate a grant. In some cases, the mapping may represent a dynamic mapping that may change when different PCIs 310 are activated or deactivated (e.g., for communications between the UE 115 and the base station 105). The base station 105 and the UE 115 may identify the mapping based on a predefined rule or a configured mapping (e.g., according to a wireless communications standard), where the mapping may indicate an association between one or more PCIs 310 and one or more CORESETs 305 configured for communications between the UE 115 and the base station 105. The base station 105 may indicate to the UE 115 one or more active PCIs 310 associated with one or more corresponding active serving cells and/or TRPs for communications between the UE 115 and the base station 105. The UE 115 and the base station 105 may identify a mapping based on the one or more active PCIs 310.

In one example, PCIs 310-a, 310-b, and 310-f may be inactive, while PCIs 310-c, 310-d, and 310-e may be active and may be respectively associated with CORESETs 305-a, 305-b, and 305-c via a mapping identified by the UE 115 and by the base station 105. For example, the indexes associated with the CORESETs 305, from lowest to highest (e.g., from 1 to 3), may be mapped (e.g., implicitly) to the active or selected PCIs 310, from a lowest to a highest PCI value. In some cases, the mapping may additionally or alternatively be based on a lowest to highest CORESET index mapping to a highest to lowest PCI value, or may be based on another mapping rule. In some cases, the mapping or the rule may provide mapping rules for PCIs 310-a through 310-f. The base station 105 may change the active PCIs 310, and the base station 105 and the UE 115 may, for example, identify a new CORESET 305 to PCI 310 mapping based on the active PCIs 310. For example, the base station 105 and the UE 115 may continue to map the indexes associated with the same CORESETs 305, from lowest to highest, to the new active or selected PCIs 310, from a lowest to a highest PCI value.

The base station 105 may transmit a grant scheduling a communication (e.g., an uplink or downlink transmission) to the UE 115 using a CORESET 305 associated with an active PCI 310. For example, the base station 105 may transmit the grant via CORESET 305-a. The UE 115 may receive the grant scheduling the communication (e.g., via CORESET 305-a) and may determine that the PCI 310 associated with the scheduled communication is the PCI 310 associated with CORESET 305-a via the mapping (e.g., PCI 310-c). The UE 115 and the base station 105 may communicate via the serving cell or TRP associated with PCI 310-c, for example, using one or more parameters associated with PCI 310-c.

Figure 4:
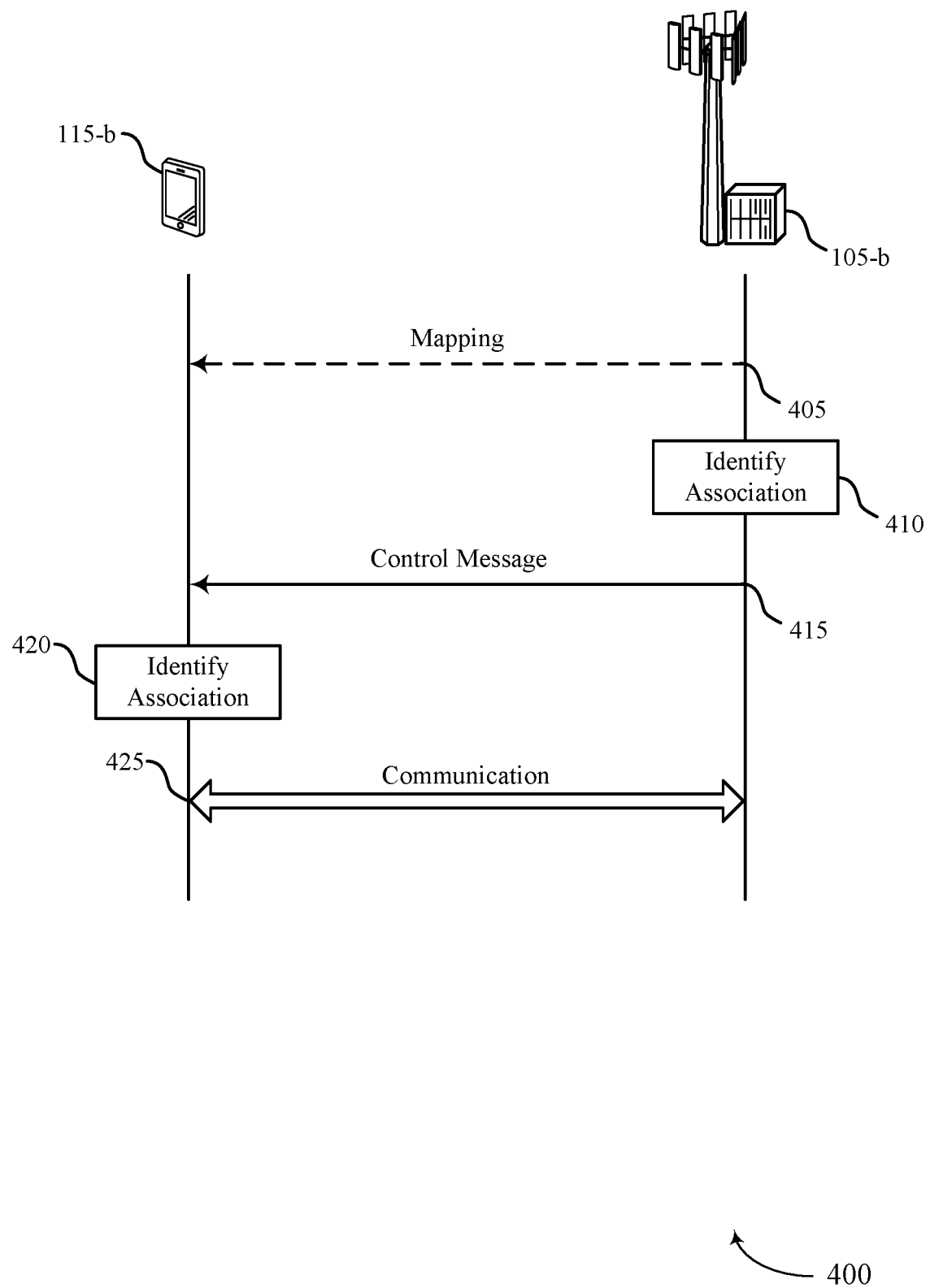
FIG. 4 illustrates an example of a process flow that supports mapping a control resource to a physical cell in accordance with aspects of the present disclosure.

FIG. 4 illustrates an example of a process flow 400 that supports mapping a control resource to a physical cell in accordance with aspects of the present disclosure. In some examples, process flow 400 may implement or be implemented by aspects of wireless communications system 100 or 200. In some examples, process flow 400 may also implement or be implemented by aspects of mapping configuration 301, 302, or 303. For example, process flow may include or be implemented by aspects of a base station 105-*b* and a UE 115-*b*, which may be examples of a base station 105 and a UE 115 described with reference to FIGS. 1-3.

In the following description of process flow 400, the operations between UE 115-*b* and base station 105-*b* may be transmitted in a different order than the order shown, or the operations performed by UE 115-*b* and base station 105-*b* may be performed in different orders or at different times. For example, some operations may also be left out of process flow 400, or other operations may be added to process flow 400. Although UE 115-*b* and base station 105-*b* are shown performing the operations of process flow 400, some aspects of some operations may also be performed by one or more other wireless devices (e.g., operations performed by base station 105-*b* may be performed by one or more other base stations 105 in communication with UE 115-*b*).

At 405, in some cases, base station 105-*b* may transmit, to UE 115-*b*, an indication of a mapping of one or more respective PCIs to at least some, if not each, search space in a group of search spaces, at least some, if not each, CORESET in a group of CORESETs, or any combination thereof. In some cases, base station 105-*b* may transmit the indication of the mapping via RRC signaling, a DCI message, or a MAC CE, or any combination thereof. In some cases, the mapping indicated by base station 105-*b* may be semi-static (e.g., a semi-static table), such that the mapping may not change when one or more active PCIs change (e.g., for communications between base station 105-*b* and UE 115-*b*). In some cases, the mapping indicated by base station 105-*b* may be based on one or more active PCIs, such that if the one or more active PCIs are changed the mapping may also change. In some cases, if base station 105-*b* changes the one or more active PCIs, base station 105-*b* may configure and transmit an additional or updated mapping to UE 115-*b*.

At 410, base station 105-*b* may identify an association between a CORESET of a search space and one or more PCIs for communications with UE 115-*b*. For example, as described herein, base station 105-*b* may identify the association based on the indication of the mapping transmitted to UE 115-*b* or based on a defined rule (e.g., in a wireless communications standard or previously configured at a device such as UE 115-*b* or base station 105-*b*) mapping the one or more PCIs to the CORESET. In some cases, the one or more PCIs may be active PCIs used for communications between UE 115-*b* and base station 105-*b*. In some cases, the one or more PCIs may be included in a group of PCIs, where the group of PCIs may include all of the candidate PCIs configured for the TRPs of a serving cell or may include candidate PCIs configured for a group of serving cells used for L1 or L2 based cell selection, among other examples.

At 415, base station 105-*b* may transmit, to UE 115-*b*, a control message (e.g., a grant) scheduling a communication (e.g., an uplink or downlink message) between UE 115-*b* and base station 105-*b*. Base station 105-*b* may transmit the control message via the CORESET of the search space and based on identifying the association. For example, base station 105-*b* may identify one or more PCIs and corresponding TRPs and/or serving cells for the communication and may select the CORESET for transmission of the control message based on the association between the one or more PCIs and the CORESET.

At 420, UE 115-*b* may identify an association between the CORESET of the search space and the one or more PCIs. For example, based on receiving the control message via the CORESET, UE 115-*b* may identify an association between the CORESET and the one or more PCIs. As described herein, UE 115-*b* may identify the association based on the indication of the mapping received from base station 105-*b*, or based on a defined rule (e.g., in a wireless communications standard or previously configured at a device such as UE 115-*b* or base station 105-*b*) mapping the one or more PCIs to the CORESET. UE 115-*b* may additionally determine (e.g., based on identifying the association) that the one or more PCIs and corresponding TRPs and/or serving cells are to be used for the reception or transmission of the scheduled communication with base station 105-*b*.

At 425, UE 115-*b* and base station 105-*b* may communicate according to one or more parameters associated with the one or more PCIs, based on the association between the CORESET and the one or more PCIs. For example, UE 115-*b* may transmit an uplink message scheduled by the control message or base station 105-*b* may transmit a downlink message scheduled by the control message. The one or more parameters may include a TCI state for the communication, a bit scrambling technique for a shared channel (e.g., PDSCH or PUSCH) carrying the communication, a rate matching pattern for a shared channel carrying the communication, one or more beam parameters, or any combination thereof.

For example, UE 115-*b* or base station 105-*b* may determine (e.g., based on one or more configured communication parameters) that processing of the uplink or downlink message is to be performed using a default input based on a PCI. Accordingly, UE 115-*b* and/or base station 105-*b* may apply, on a shared channel carrying the communication, a bit scrambling technique associated with the one or more PCIs. Additionally or alternatively, each PCI and a corresponding TRP or serving cell may be configured such that communications use a different rate matching pattern for different PCIs. Accordingly, UE 115-*b* or base station 105-*b* (or both) may apply, to a shared channel carrying the communication, a rate matching pattern associated with the one or more PCIs. Additionally or alternatively, each PCI may correspond to a different TRP, and each TRP (e.g., and corresponding PCI) may be associated with a different transmit and/or receive beam. Accordingly, UE 115-*b* and/or base station 105-*b* may apply, to the communication, one or more beam parameters associated with the one or more PCIs.

Figure 5:
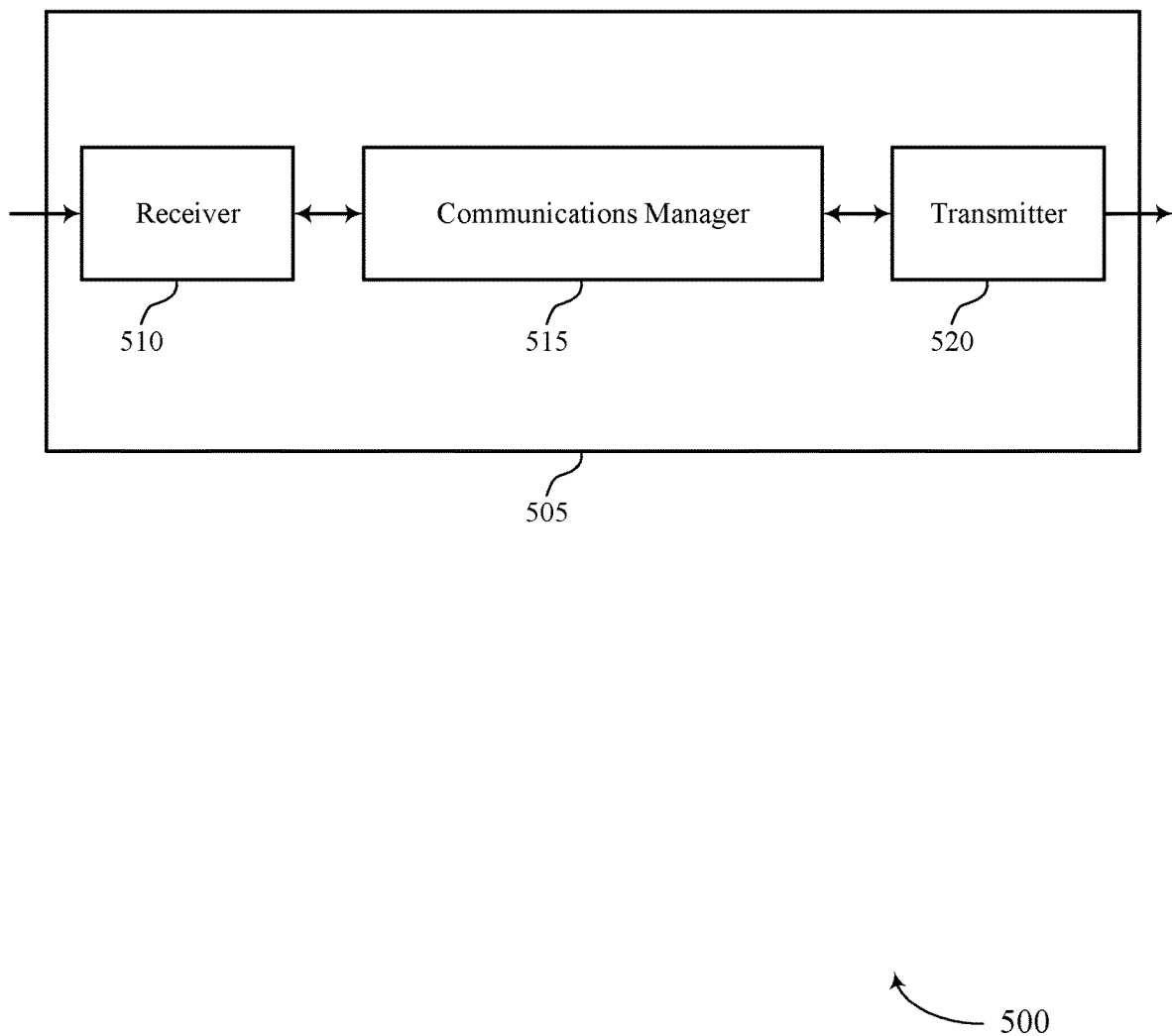
FIGS. 5 and 6 show block diagrams of devices that support mapping a control resource to a physical cell in accordance with aspects of the present disclosure.

FIG. 5 shows a block diagram 500 of a device 505 that supports mapping a control resource to a physical cell in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to mapping a control resource to a physical cell, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station via one or more CORESETs of one or more search spaces, a control message scheduling a communication between the UE and the base station, identify, based on receiving the control message, an association between the one or more CORESETs of the one or more search spaces and one or more PCIs, and communicate, based on the association between the one or more CORESETs and the one or more PCIs, with the base station according to one or more parameters associated with the one or more PCIs. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase communication quality and reduce communication overhead at a wireless device (e.g., a UE 115) by supporting PCI identification for one or more communications between a UE and a base station. The identification of a PCI (e.g., and one or more associated communication parameters) may result in decreased overhead, and increased communication quality or throughput (or any combination thereof) due to the application of the one or more associated communication parameters to the one or more communications. Accordingly, communications manager 515 may save power and increase battery life at a wireless device (e.g., a UE 115) by strategically increasing a quality of communications and reducing communication overhead at a wireless device (e.g., a UE 115).

Figure 6:
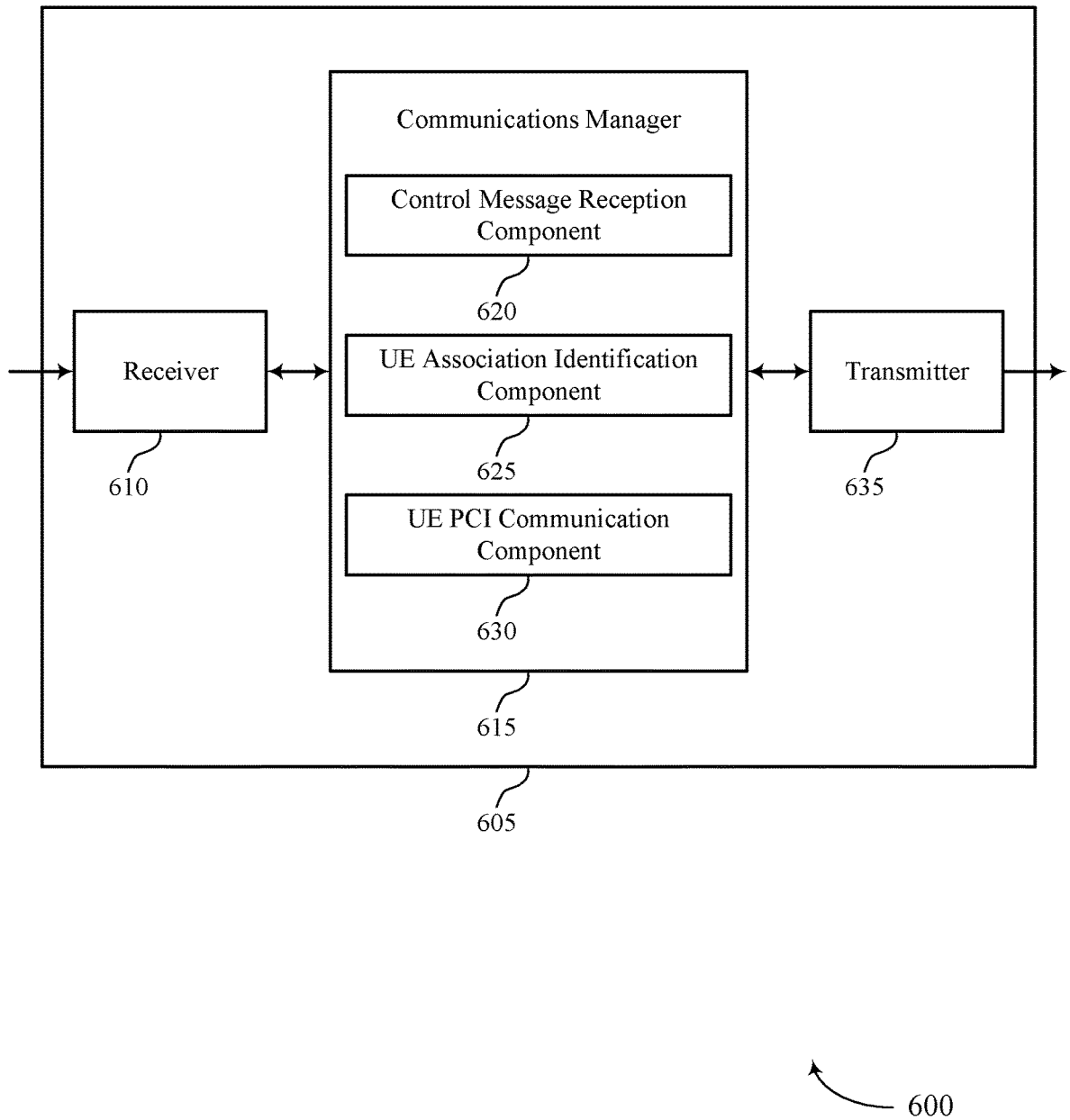

FIG. 6 shows a block diagram 600 of a device 605 that supports mapping a control resource to a physical cell in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to mapping a control resource to a physical cell, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control message reception component 620, a UE association identification component 625, and a UE PCI communication component 630. The communications manager 615 may be an example of aspects of the communications manager 810 described herein.

The control message reception component 620 may receive, from a base station via one or more CORESETs of one or more search spaces, a control message scheduling a communication between the UE and the base station. The UE association identification component 625 may identify, based on receiving the control message, an association between the one or more CORESETs of the one or more search spaces and one or more PCIs. The UE PCI communication component 630 may communicate, based on the association between the one or more CORESETs and the one or more PCIs, with the base station according to one or more parameters associated with the one or more PCIs.

The transmitter 635 may transmit signals generated by other components of the device 605. In some examples, the transmitter 635 may be collocated with a receiver 610 in a transceiver. For example, the transmitter 635 may be an example of aspects of the transceiver 820 described with reference to FIG. 8. The transmitter 635 may utilize a single antenna or a set of antennas.

A processor of a wireless device (e.g., controlling the receiver 610, the transmitter 635, or the transceiver 820 as described with reference to FIG. 8) may increase communication quality and may decrease communication overhead. The increased communication quality and reduced overhead may reduce power consumption (e.g., via implementation of system components described with reference to FIG. 7) compared to other systems and techniques, for example, that do not support some PCI identification methods, which may decrease communication quality and increase power consumption. Further, the processor of the UE 115 may identify one or more aspects of a PCI-to-CORESET association (e.g., a mapping) as described herein. The processor of the wireless device may use the PCI-to-CORESET association to perform one or more actions that may result in increased communication quality and decreased overhead, as well as save power and increase battery life at the wireless device (e.g., by strategically supporting identification of a PCI and associated communication parameter(s), which may increase communication quality), among other benefits.

Figure 7:
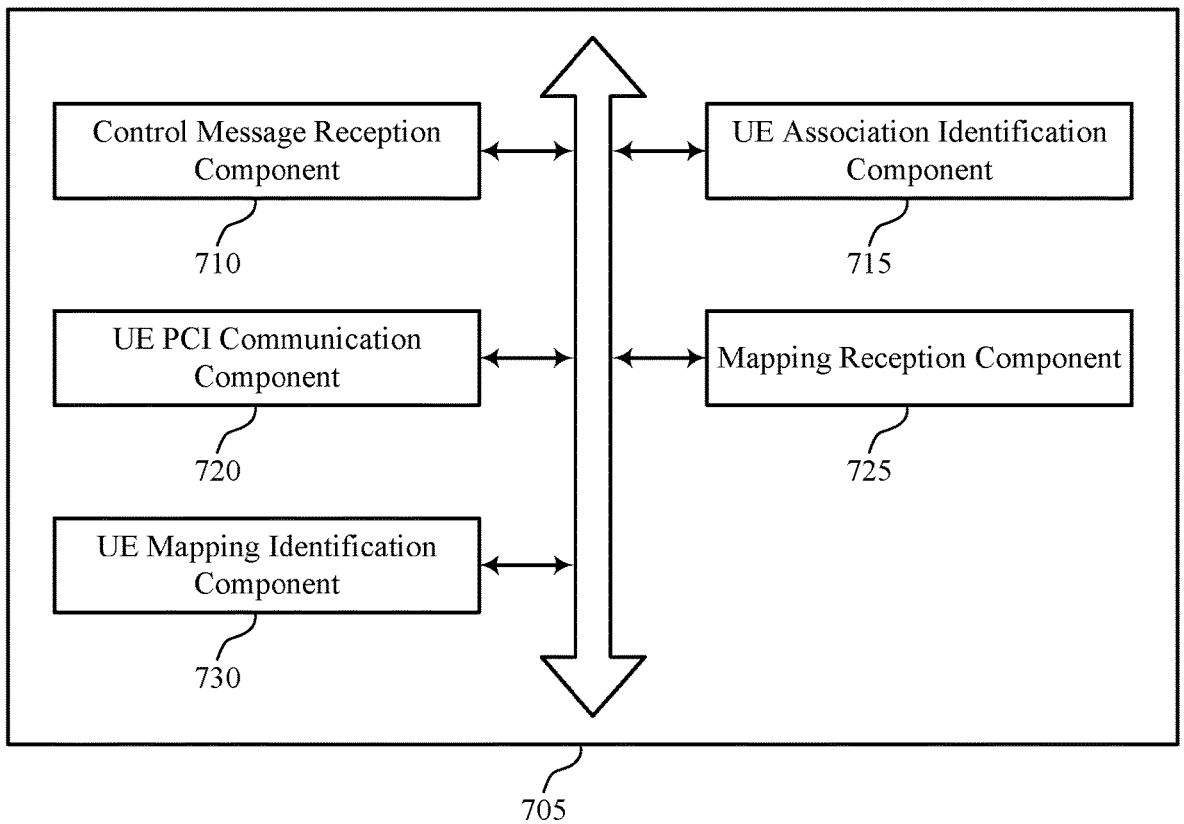
FIG. 7 shows a block diagram of a communications manager that supports mapping a control resource to a physical cell in accordance with aspects of the present disclosure.

FIG. 7 shows a block diagram 700 of a communications manager 705 that supports mapping a control resource to a physical cell in accordance with aspects of the present disclosure. The communications manager 705 may be an example of aspects of a communications manager 515, a communications manager 615, or a communications manager 810 described herein. The communications manager 705 may include a control message reception component 710, a UE association identification component 715, a UE PCI communication component 720, a mapping reception component 725, and a UE mapping identification component 730. Each of these may communicate, directly or indirectly, with one another (e.g., via one or more buses).

The control message reception component 710 may receive, from a base station via one or more CORESETs of one or more search spaces, a control message scheduling a communication between the UE and the base station.

The UE association identification component 715 may identify, based on receiving the control message, an association between the one or more CORESETs of the one or more search spaces and one or more PCIs. In some cases, the one or more PCIs are indicated via physical layer signaling, MAC signaling, or any combination thereof.

The UE PCI communication component 720 may communicate, based on the association between the one or more CORESETs and the one or more PCIs, with the base station according to one or more parameters associated with the one or more PCIs. In some cases, the one or more parameters associated with the one or more PCIs include a bit scrambling technique, a rate matching pattern, one or more beam parameters, or any combination thereof. In some examples, the UE PCI communication component 720 may determine that the bit scrambling technique associated with the one or more PCIs includes an input for a shared channel (e.g., a PDSCH or a PUSCH) for the communication. In some examples, the UE PCI communication component 720 may apply the bit scrambling technique to the shared channel based on determining that the bit scrambling technique associated with the one or more PCIs includes the input.

In some examples, the UE PCI communication component 720 may apply the rate matching pattern associated with the one or more PCIs to a shared channel carrying the communication, where each of a group of PCIs including the one or more PCIs is associated with a different rate matching pattern. In some examples, the UE PCI communication component 720 may communicate with the base station via a subset of a set of TRPs of a serving cell that are each associated with a respective PCI, where the one or more PCIs correspond to one or more TRPs of the subset. In some examples, the UE PCI communication component 720 may communicate with the base station via a subset of a set of serving cells that are each associated with a respective PCI, where the one or more PCIs correspond to one or more serving cells of the subset.

The mapping reception component 725 may receive an indication of a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where identifying the association between the one or more CORESETs and the one or more PCIs is based on the indication of the mapping.

In some examples, the mapping reception component 725 may receive an indication of a mapping of the one or more respective PCIs to a respective pool index of each search space of the group of search spaces, a respective pool index of each CORESET of the group of CORESETs, or any combination thereof.

In some examples, the mapping reception component 725 may receive, from the base station, an indication of a change of one or more active PCIs from a first set of active PCIs to a second set of active PCIs including the one or more PCIs, where the mapping applies to the first set of active PCIs and the second set of active PCIs.

In some examples, the mapping reception component 725 may receive, from the base station, an indication of a second mapping of one or more respective PCIs to each search space of the group of search spaces, each CORESET of the group of CORESETs, or any combination thereof.

In some examples, the mapping reception component 725 may receive an indication of a change of one or more active PCIs from a first set of active PCIs to a second set of active PCIs including the one or more PCIs, where the second mapping applies to the first set of active PCIs and the mapping applies to the second set of active PCIs.

The UE mapping identification component 730 may identify a rule indicating a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where identifying the association between the one or more CORESETs and the one or more PCIs is based on the mapping. In some examples, the UE mapping identification component 730 may identify a mapping of the one or more respective PCIs to a respective pool index of each search space of the group of search spaces, a respective pool index of each CORESET of the group of CORESETs, or any combination thereof.

In some examples, the UE mapping identification component 730 may identify a second mapping of one or more respective PCIs to each search space of the group of search spaces, each CORESET of the group of CORESETs, or any combination thereof. In some examples, the UE mapping identification component 730 may receive an indication of a change of one or more active PCIs from a first set of active PCIs to a second set of active PCIs including the one or more PCIs, where the second mapping applies to the first set of active PCIs and the mapping applies to the second set of active PCIs. In some examples, the UE mapping identification component 730 may map one or more CORESET indexes, one or more CORESET pool indexes, or any combination thereof to the one or more active PCIs according to a sequence based on the rule.

In some examples, the UE mapping identification component 730 may pair one or more respective CORESET indexes, one or more respective CORESET pool indexes, or any combination thereof, in an order from a lowest index to a highest index, with one or more respective active PCIs in an order from a lowest value to a highest value.

Figure 8:
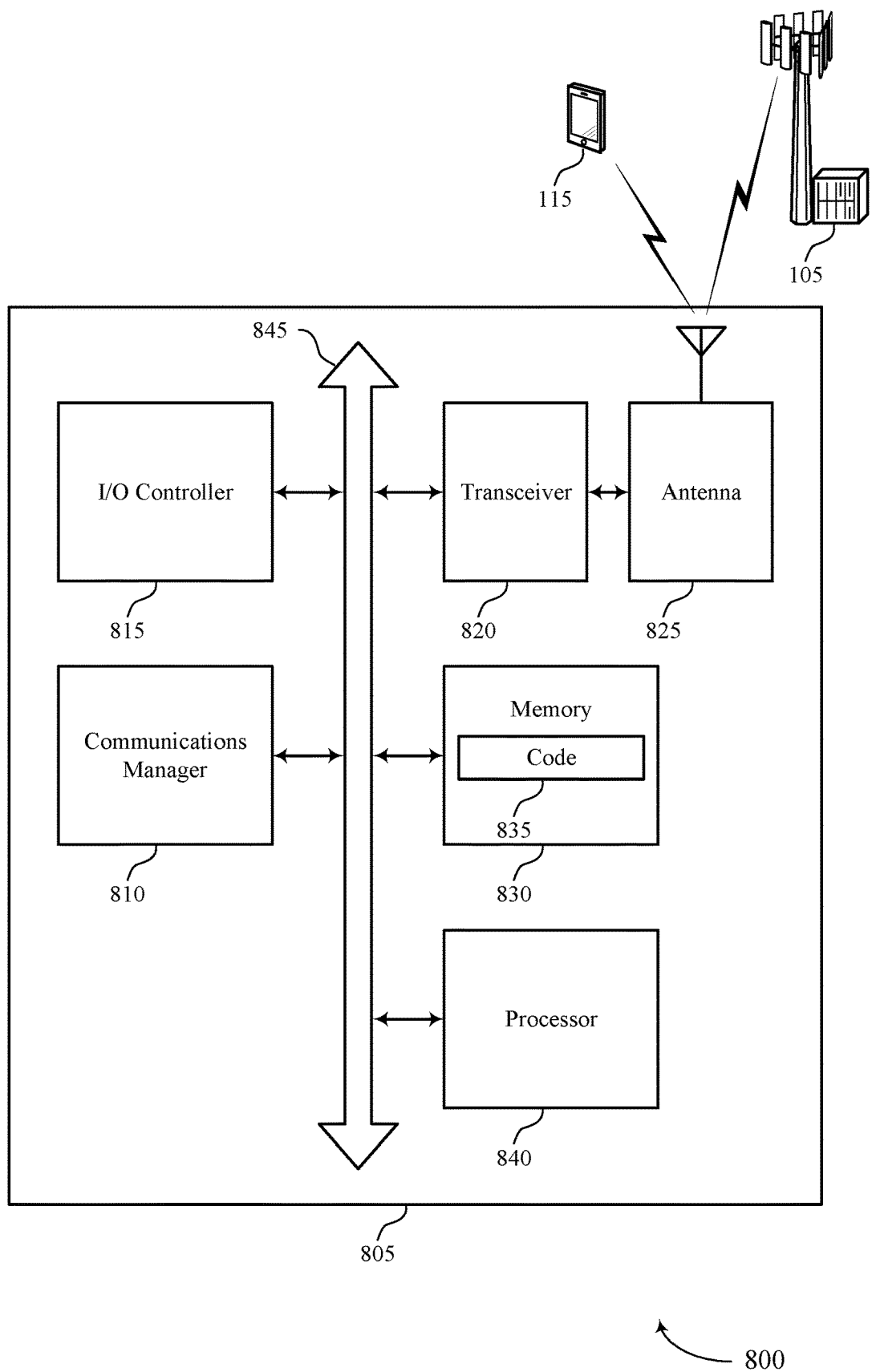
FIG. 8 shows a diagram of a system including a device that supports mapping a control resource to a physical cell in accordance with aspects of the present disclosure.

FIG. 8 shows a diagram of a system 800 including a device 805 that supports mapping a control resource to a physical cell in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station via one or more CORESETs of one or more search spaces, a control message scheduling a communication between the UE and the base station, identify, based on receiving the control message, an association between the one or more CORESETs of the one or more search spaces and one or more PCIs, and communicate, based on the association between the one or more CORESETs and the one or more PCIs, with the base station according to one or more parameters associated with the one or more PCIs.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting mapping a control resource to a physical cell).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
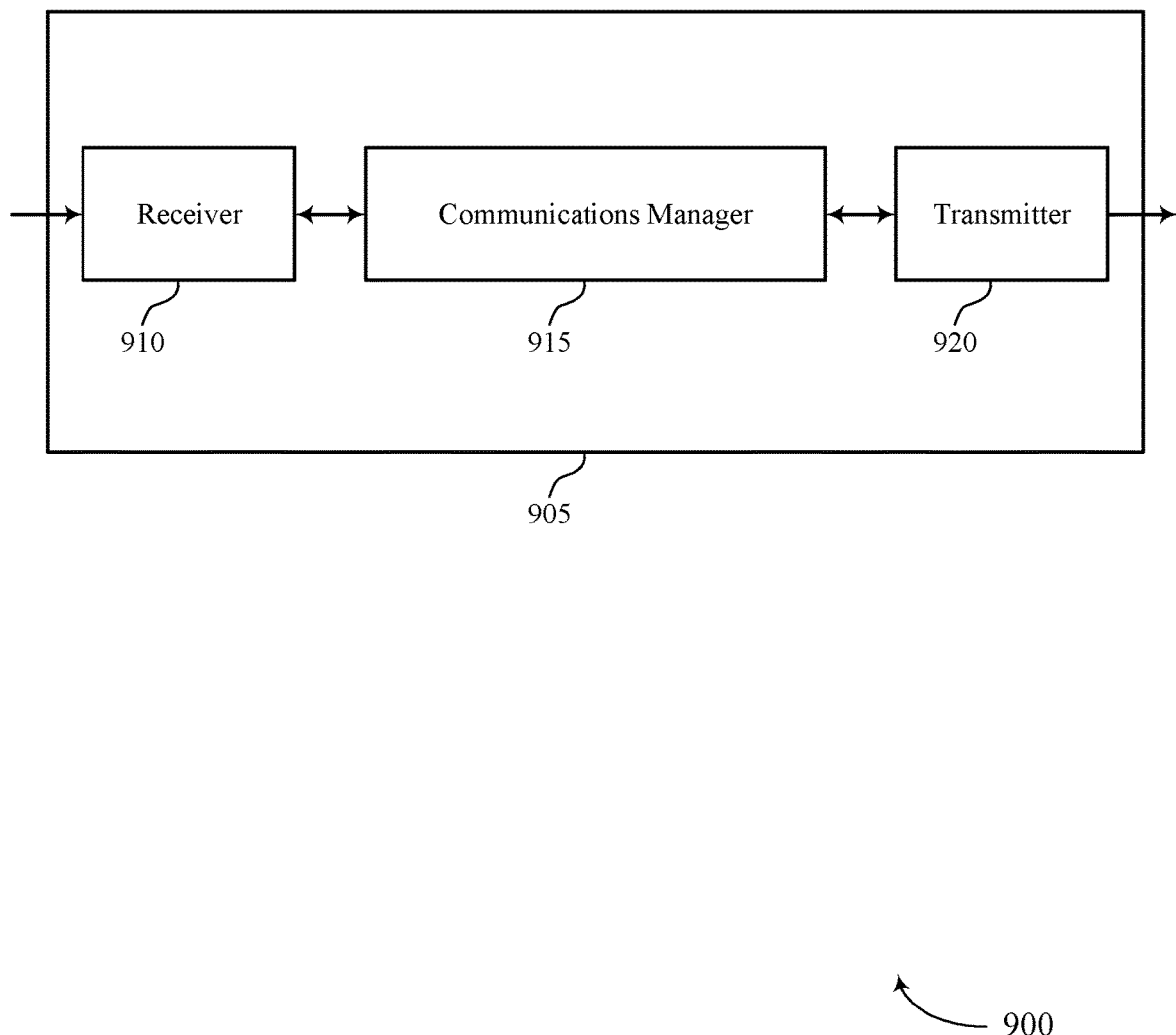
FIGS. 9 and 10 show block diagrams of devices that support mapping a control resource to a physical cell in accordance with aspects of the present disclosure.

FIG. 9 shows a block diagram 900 of a device 905 that supports mapping a control resource to a physical cell in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to mapping a control resource to a physical cell, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify an association between one or more CORESETs of one or more search spaces and one or more PCIs for communications with a UE, transmit, to the UE via the one or more CORESETs of the one or more search spaces and based on identifying the association, a control message scheduling a communication between the UE and the base station, and communicate, based on the association between the one or more CORESETs and the one or more PCIs, with the UE according to one or more parameters associated with the one or more PCIs. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas.

Figure 10:
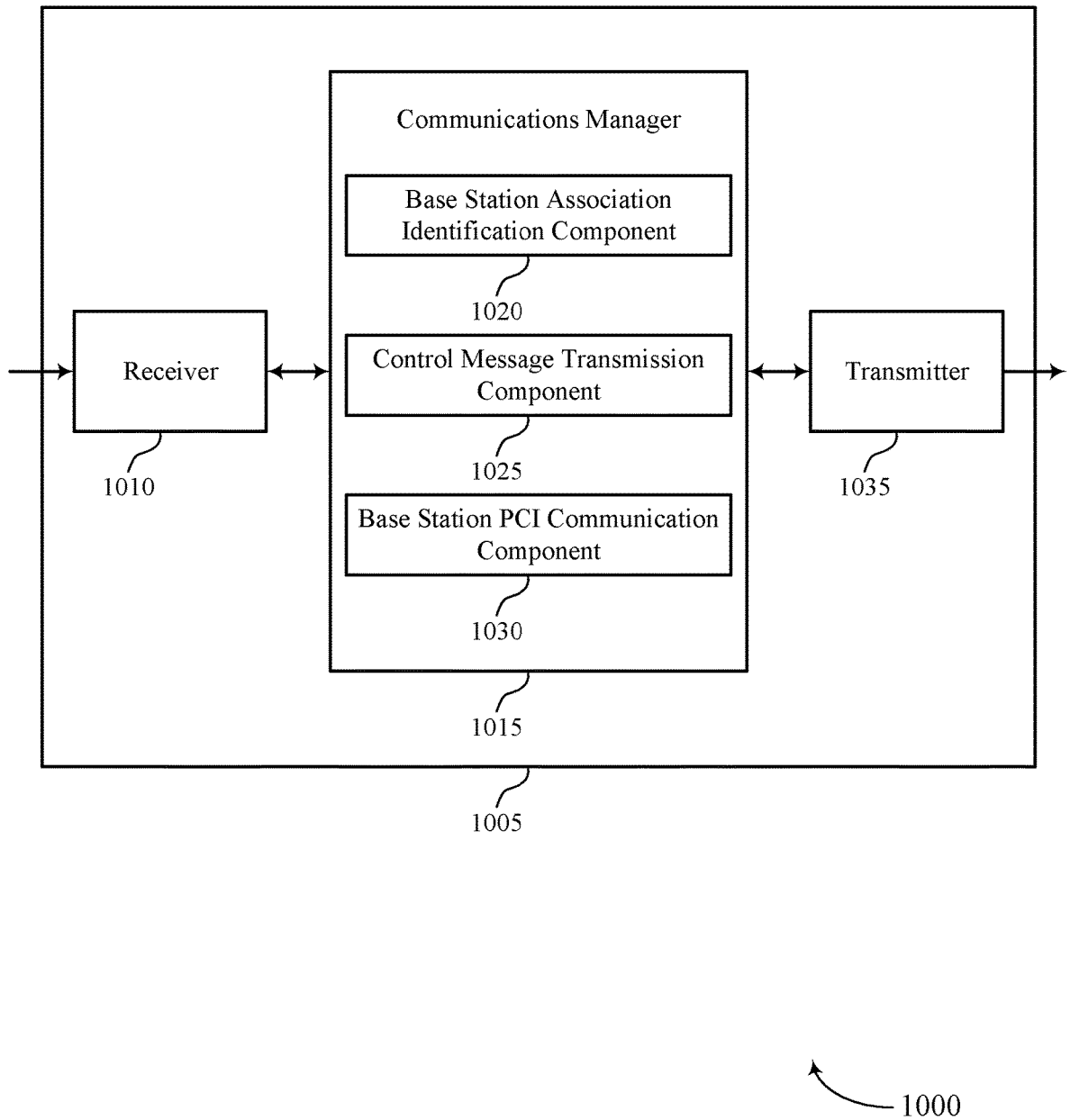

FIG. 10 shows a block diagram 1000 of a device 1005 that supports mapping a control resource to a physical cell in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to mapping a control resource to a physical cell, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a base station association identification component 1020, a control message transmission component 1025, and a base station PCI communication component 1030. The communications manager 1015 may be an example of aspects of the communications manager 1210 described herein.

The base station association identification component 1020 may identify an association between one or more CORESETs of one or more search spaces and one or more PCIs for communications with a UE. The control message transmission component 1025 may transmit, to the UE via the one or more CORESETs of the one or more search spaces and based on identifying the association, a control message scheduling a communication between the UE and the base station. The base station PCI communication component 1030 may communicate, based on the association between the one or more CORESETs and the one or more PCIs, with the UE according to one or more parameters associated with the one or more PCIs.

The transmitter 1035 may transmit signals generated by other components of the device 1005. In some examples, the transmitter 1035 may be collocated with a receiver 1010 in a transceiver. For example, the transmitter 1035 may be an example of aspects of the transceiver 1220 described with reference to FIG. 12. The transmitter 1035 may utilize a single antenna or a set of antennas.

Figure 11:
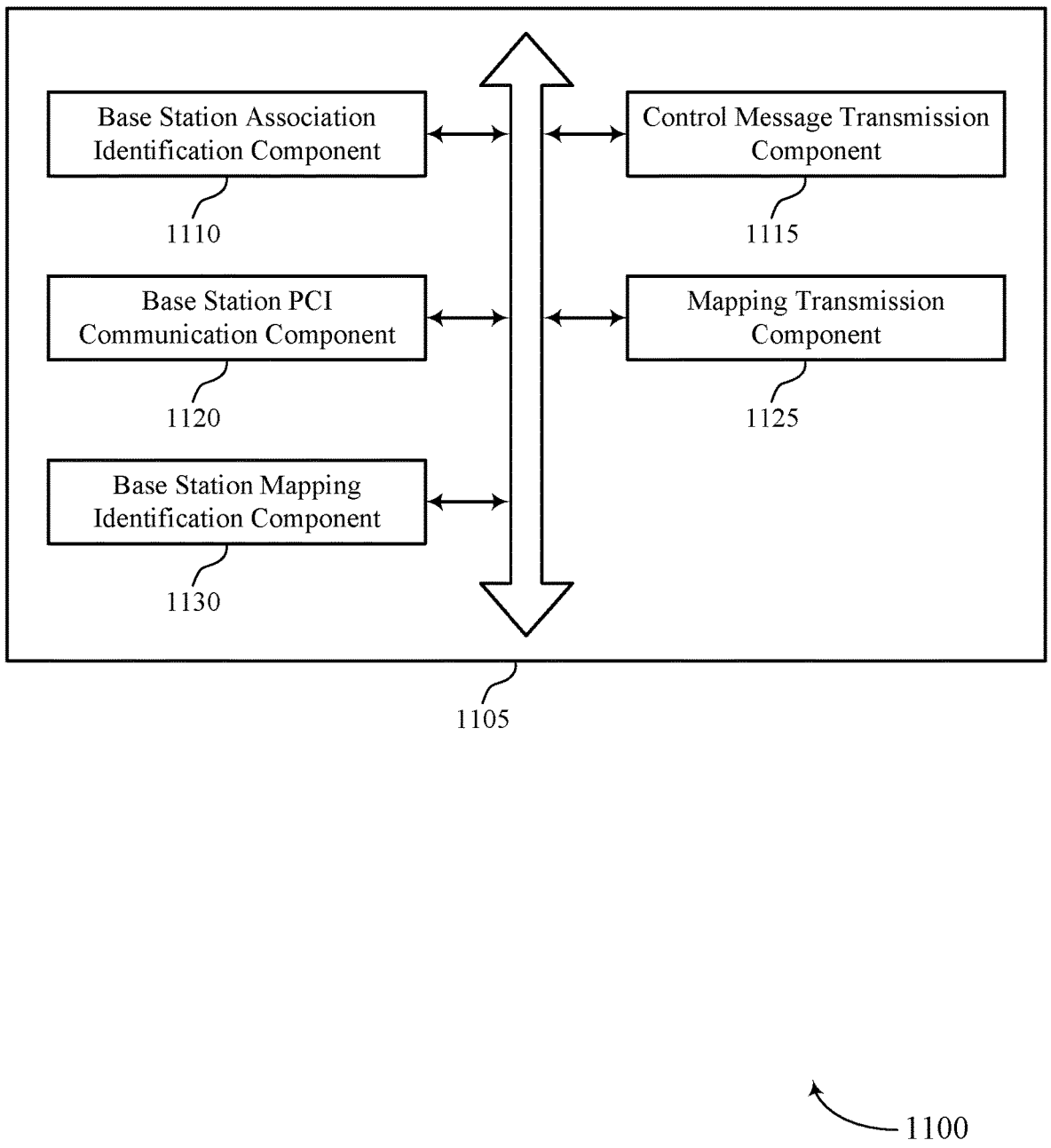
FIG. 11 shows a block diagram of a communications manager that supports mapping a control resource to a physical cell in accordance with aspects of the present disclosure.

FIG. 11 shows a block diagram 1100 of a communications manager 1105 that supports mapping a control resource to a physical cell in accordance with aspects of the present disclosure. The communications manager 1105 may be an example of aspects of a communications manager 915, a communications manager 1015, or a communications manager 1210 described herein. The communications manager 1105 may include a base station association identification component 1110, a control message transmission component 1115, a base station PCI communication component 1120, a mapping transmission component 1125, and a base station mapping identification component 1130. Each of these may communicate, directly or indirectly, with one another (e.g., via one or more buses).

The base station association identification component 1110 may identify an association between one or more CORESETs of one or more search spaces and one or more PCIs for communications with a UE. In some cases, the one or more PCIs are indicated via physical layer signaling, MAC signaling, or any combination thereof.

The control message transmission component 1115 may transmit, to the UE via the one or more CORESETs of the one or more search spaces and based on identifying the association, a control message scheduling a communication between the UE and the base station.

The base station PCI communication component 1120 may communicate, based on the association between the one or more CORESETs and the one or more PCIs, with the UE according to one or more parameters associated with the one or more PCIs. In some cases, the one or more parameters associated with the one or more PCIs include a bit scrambling technique, a rate matching pattern, one or more beam parameters, or any combination thereof. In some examples, the base station PCI communication component 1120 may determine that the bit scrambling technique associated with the one or more PCIs includes an input for a shared channel (e.g., PDSCH or PUSCH) for the communication. In some examples, the base station PCI communication component 1120 may apply the bit scrambling technique to the shared channel based on determining that the bit scrambling technique associated with the one or more PCIs includes the input.

In some examples, the base station PCI communication component 1120 may apply the rate matching pattern associated with the one or more PCIs to a shared channel carrying the communication, where each of a group of PCIs including the one or more PCIs is associated with a different rate matching pattern. In some examples, the base station PCI communication component 1120 may communicate with the UE via a subset of a set of TRPs of a serving cell that are each associated with a respective PCI, where the one or more PCIs correspond to one or more TRPs of the subset. In some examples, the base station PCI communication component 1120 may communicate with the UE via a subset of a set of serving cells that are each associated with a respective PCI, where the one or more PCIs correspond to one or more serving cells of the subset.

The mapping transmission component 1125 may transmit an indication of a mapping of one or more respective PCIs to each search space of a group of search spaces, each CORESET of a group of CORESETs, or any combination thereof, where the group of search spaces includes the one or more search spaces and the group of CORESETs includes the CORESET, and where the association between the one or more CORESETs and the one or more PCIs is based on the mapping. In some examples, the mapping transmission component 1125 may transmit an indication of a mapping of the one or more respective PCIs to a respective pool index of each search space of the group of search spaces, a respective pool index of each CORESET of the group of CORESETs, or any combination thereof.

In some examples, the mapping transmission component 1125 may transmit, to the UE, an indication of a change of one or more active PCIs from a first set of active PCIs to a second set of active PCIs including the one or more PCIs, where the mapping applies to the first set of active PCIs and the second set of active PCIs. In some examples, the mapping transmission component 1125 may transmit, to the UE, an indication of a second mapping of one or more respective PCIs to each search space of the group of search spaces, each CORESET of the group of CORESETs, or any combination thereof. In some examples, the mapping transmission component 1125 may transmit an indication of a change of one or more active PCIs from a first set of active PCIs to a second set of active PCIs including the one or more PCIs, where the second mapping applies to the first set of active PCIs and the mapping applies to the second set of active PCIs.

The base station mapping identification component 1130 may identify a rule indicating a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where identifying the association between the one or more CORESETs and the one or more PCIs is based on the mapping. In some examples, the base station mapping identification component 1130 may identify a mapping of the one or more respective PCIs to a respective pool index of each search space of the group of search spaces, a respective pool index of each CORESET of the group of CORESETs, or any combination thereof.

In some examples, the base station mapping identification component 1130 may identify a second mapping of one or more respective PCIs to each search space of the group of search spaces, each CORESET of the group of CORESETs, or any combination thereof. In some examples, the base station mapping identification component 1130 may transmit an indication of a change of one or more active PCIs from a first set of active PCIs to a second set of active PCIs including the one or more PCIs, where the second mapping applies to the first set of active PCIs and the mapping applies to the second set of active PCIs. In some examples, the base station mapping identification component 1130 may map one or more CORESET indexes, one or more CORESET pool indexes, or any combination thereof to the one or more active PCIs according to a sequence based on the rule. In some examples, the base station mapping identification component 1130 may pair one or more respective CORESET indexes, one or more respective CORESET pool indexes, or any combination thereof, in an order from a lowest index to a highest index, with one or more respective active PCIs in an order from a lowest value to a highest value.

Figure 12:
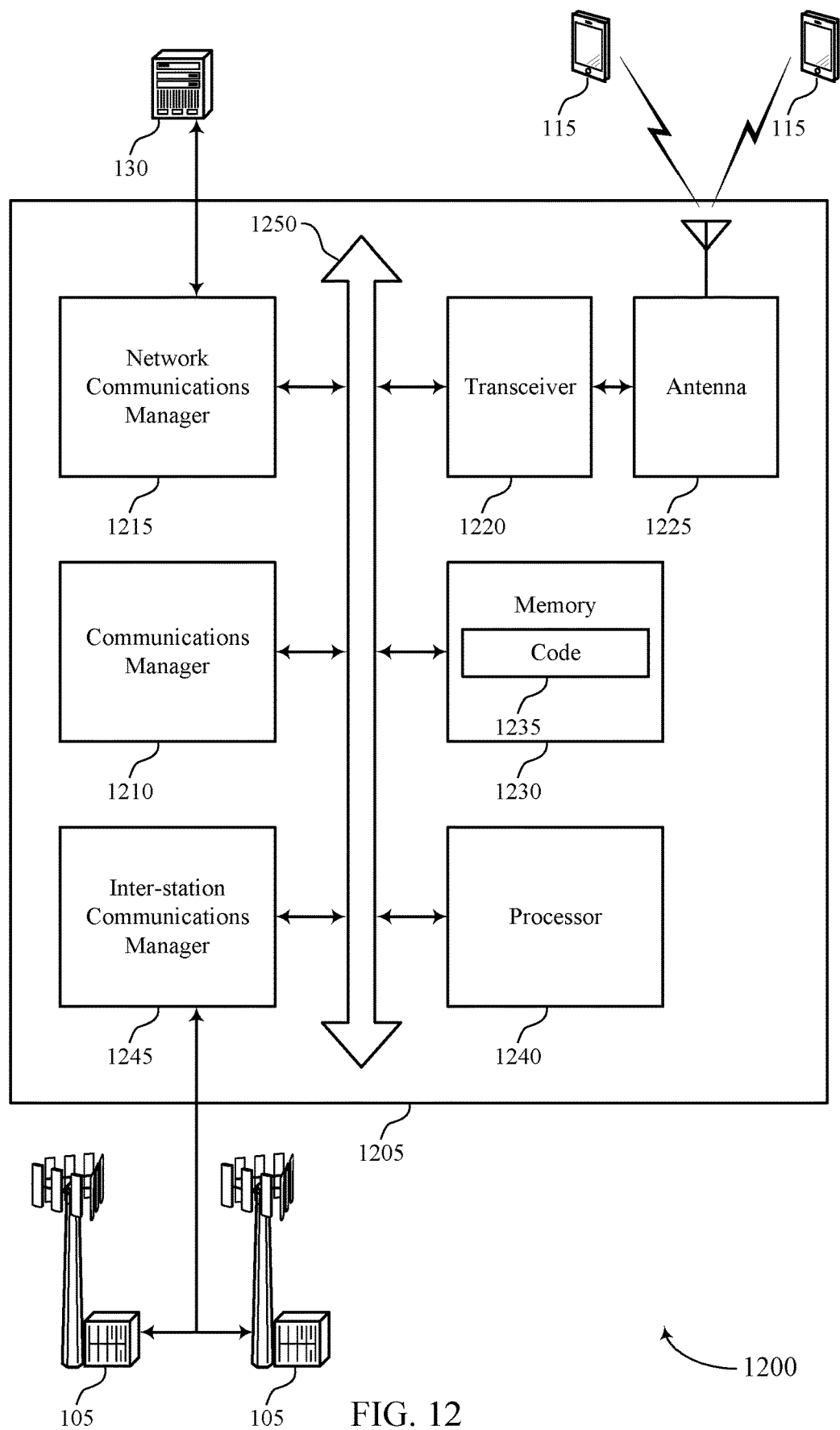
FIG. 12 shows a diagram of a system including a device that supports mapping a control resource to a physical cell in accordance with aspects of the present disclosure.

FIG. 12 shows a diagram of a system 1200 including a device 1205 that supports mapping a control resource to a physical cell in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify an association between one or more CORESETs of one or more search spaces and one or more PCIs for communications with a UE, transmit, to the UE via the one or more CORESETs of the one or more search spaces and based on identifying the association, a control message scheduling a communication between the UE and the base station, and communicate, based on the association between the one or more CORESETs and the one or more PCIs, with the UE according to one or more parameters associated with the one or more PCIs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting mapping a control resource to a physical cell).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
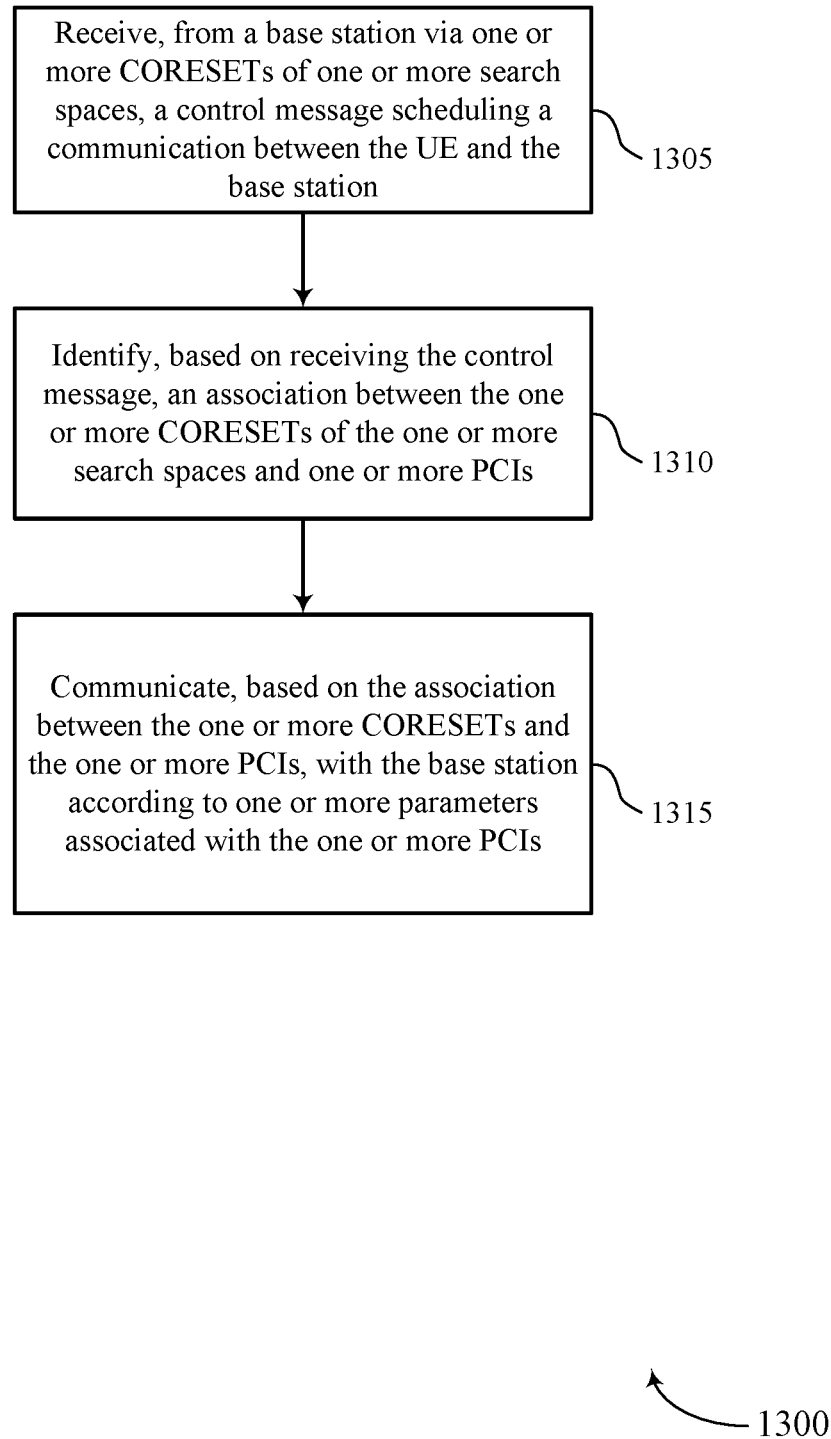
FIGS. 13 through 18 show flowcharts illustrating methods that support mapping a control resource to a physical cell in accordance with aspects of the present disclosure.

FIG. 13 shows a flowchart illustrating a method 1300 that supports mapping a control resource to a physical cell in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station via one or more CORESETs of one or more search spaces, a control message scheduling a communication between the UE and the base station. The operations of 1305 may be performed according to the methods described herein. In some examples, aspects of the operations of 1305 may be performed by a control message reception component as described with reference to FIGS. 5 through 8.

At 1310, the UE may identify, based on receiving the control message, an association between the one or more CORESETs of the one or more search spaces and one or more PCIs. The operations of 1310 may be performed according to the methods described herein. In some examples, aspects of the operations of 1310 may be performed by a UE association identification component as described with reference to FIGS. 5 through 8.

At 1315, the UE may communicate, based on the association between the one or more CORESETs and the one or more PCIs, with the base station according to one or more parameters associated with the one or more PCIs. The operations of 1315 may be performed according to the methods described herein. In some examples, aspects of the operations of 1315 may be performed by a UE PCI communication component as described with reference to FIGS. 5 through 8.

Figure 14:
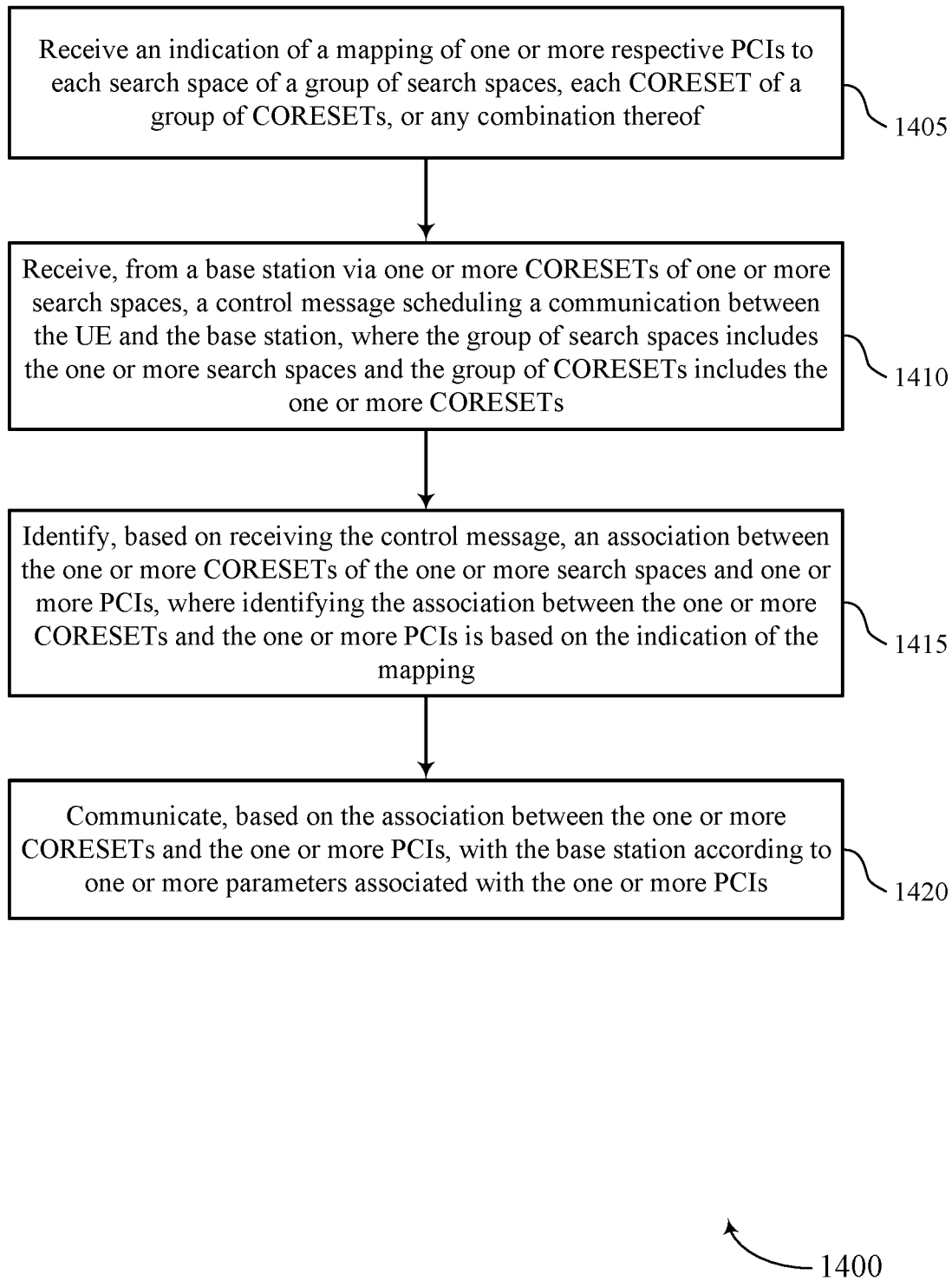

FIG. 14 shows a flowchart illustrating a method 1400 that supports mapping a control resource to a physical cell in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive an indication of a mapping of one or more respective PCIs to each search space of a group of search spaces, each CORESET of a group of CORESETs, or any combination thereof. The operations of 1405 may be performed according to the methods described herein. In some examples, aspects of the operations of 1405 may be performed by a mapping reception component as described with reference to FIGS. 5 through 8.

At 1410, the UE may receive, from a base station via one or more CORESETs of one or more search spaces, a control message scheduling a communication between the UE and the base station, where the group of search spaces includes the one or more search spaces and the group of CORESETs includes the one or more CORESETs. The operations of 1410 may be performed according to the methods described herein. In some examples, aspects of the operations of 1410 may be performed by a control message reception component as described with reference to FIGS. 5 through 8.

At 1415, the UE may identify, based on receiving the control message, an association between the one or more CORESETs of the one or more search spaces and one or more PCIs, where identifying the association between the one or more CORESETs and the one or more PCIs is based on the indication of the mapping. The operations of 1415 may be performed according to the methods described herein. In some examples, aspects of the operations of 1415 may be performed by a UE association identification component as described with reference to FIGS. 5 through 8.

At 1420, the UE may communicate, based on the association between the one or more CORESETs and the one or more PCIs, with the base station according to one or more parameters associated with the one or more PCIs. The operations of 1420 may be performed according to the methods described herein. In some examples, aspects of the operations of 1420 may be performed by a UE PCI communication component as described with reference to FIGS. 5 through 8.

Figure 15:
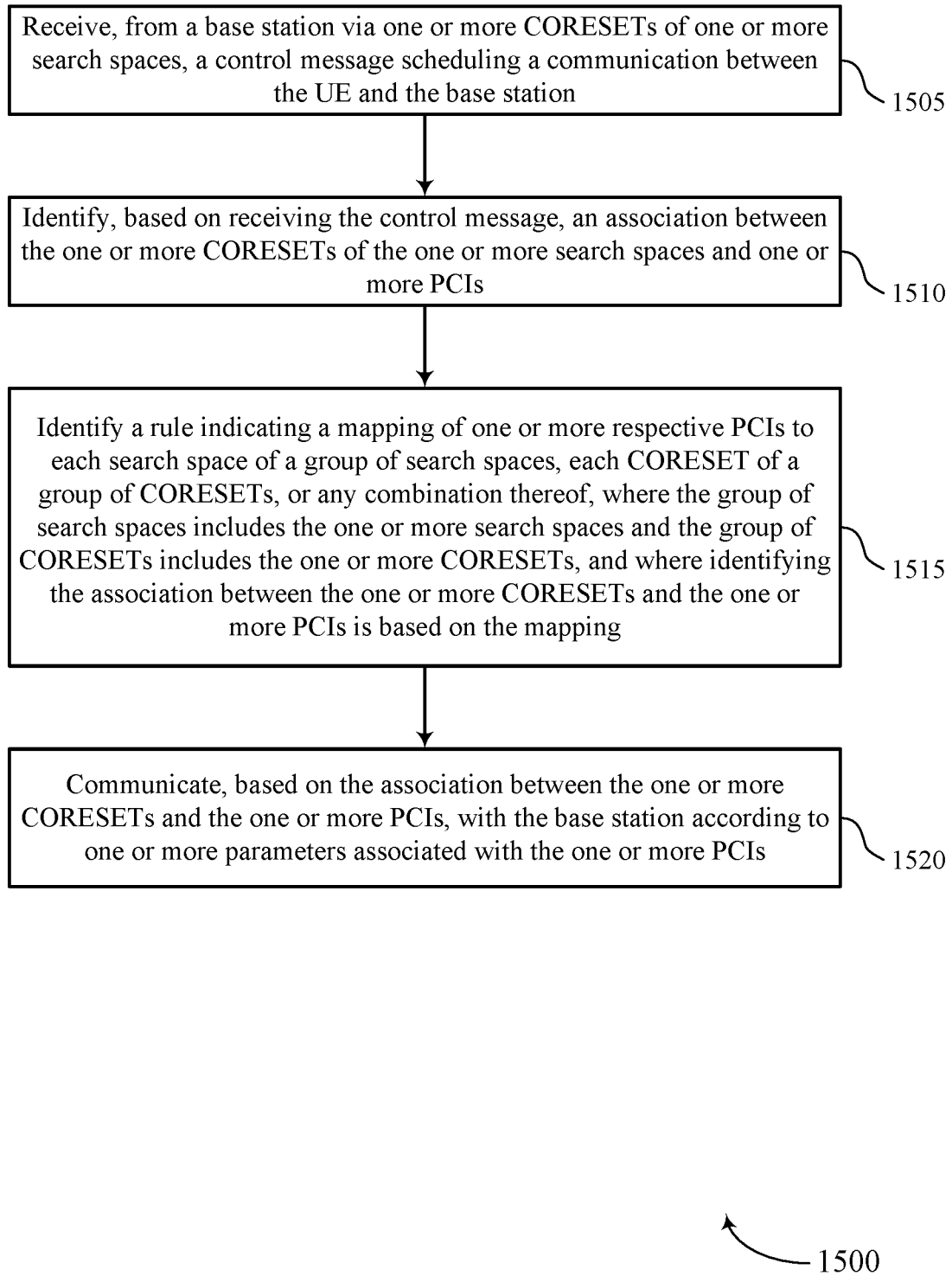

FIG. 15 shows a flowchart illustrating a method 1500 that supports mapping a control resource to a physical cell in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station via one or more CORESETs of one or more search spaces, a control message scheduling a communication between the UE and the base station. The operations of 1505 may be performed according to the methods described herein. In some examples, aspects of the operations of 1505 may be performed by a control message reception component as described with reference to FIGS. 5 through 8.

At 1510, the UE may identify, based on receiving the control message, an association between the one or more CORESETs of the one or more search spaces and one or more PCIs. The operations of 1510 may be performed according to the methods described herein. In some examples, aspects of the operations of 1510 may be performed by a UE association identification component as described with reference to FIGS. 5 through 8.

At 1515, the UE may identify a rule indicating a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where identifying the association between the one or more CORESETs and the one or more PCIs is based on the mapping. The operations of 1515 may be performed according to the methods described herein. In some examples, aspects of the operations of 1515 may be performed by a UE mapping identification component as described with reference to FIGS. 5 through 8.

At 1520, the UE may communicate, based on the association between the one or more CORESETs and the one or more PCIs, with the base station according to one or more parameters associated with the one or more PCIs. The operations of 1520 may be performed according to the methods described herein. In some examples, aspects of the operations of 1520 may be performed by a UE PCI communication component as described with reference to FIGS. 5 through 8.

Figure 16:
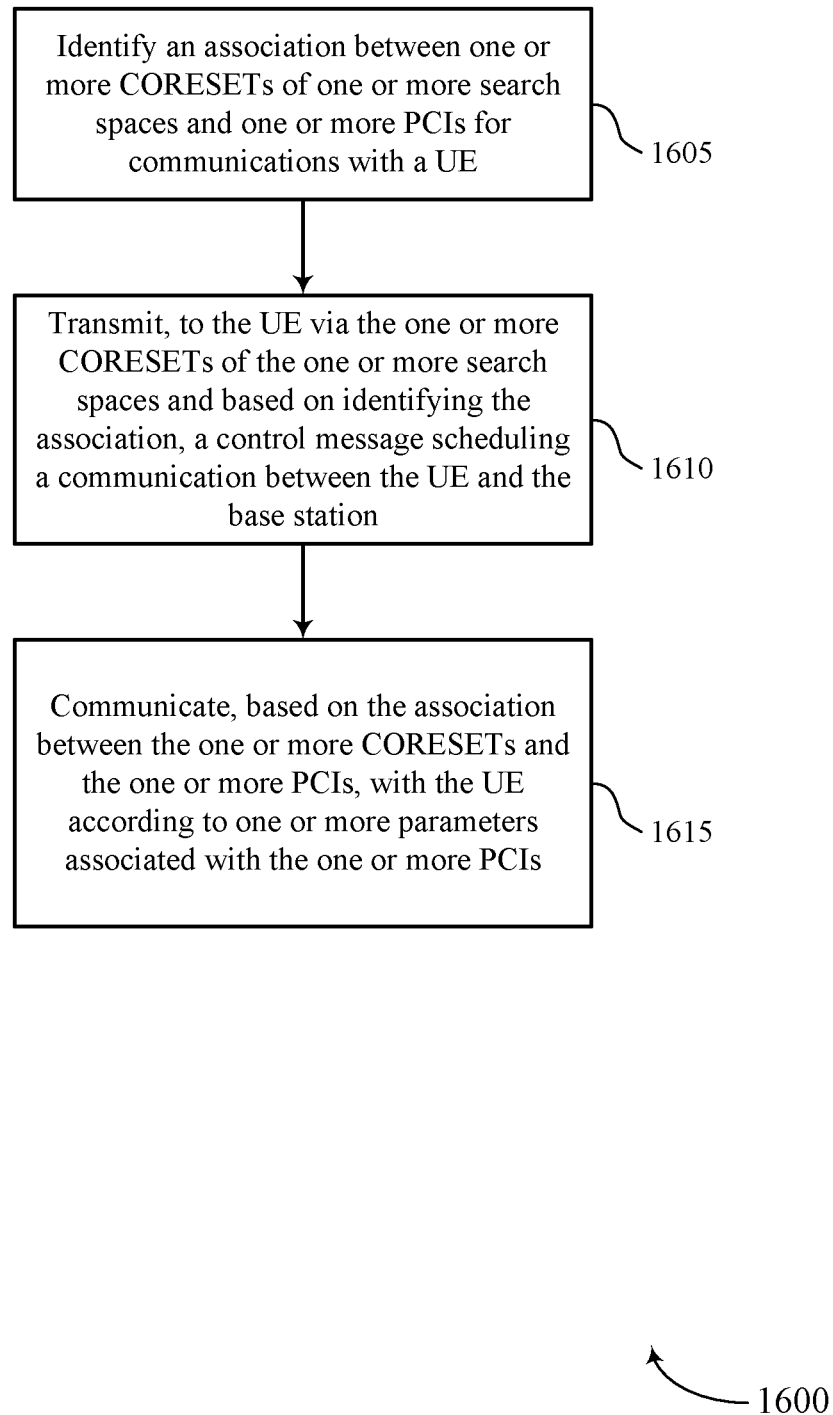

FIG. 16 shows a flowchart illustrating a method 1600 that supports mapping a control resource to a physical cell in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify an association between one or more CORESETs of one or more search spaces and one or more PCIs for communications with a UE. The operations of 1605 may be performed according to the methods described herein. In some examples, aspects of the operations of 1605 may be performed by a base station association identification component as described with reference to FIGS. 9 through 12.

At 1610, the base station may transmit, to the UE via the one or more CORESETs of the one or more search spaces and based on identifying the association, a control message scheduling a communication between the UE and the base station. The operations of 1610 may be performed according to the methods described herein. In some examples, aspects of the operations of 1610 may be performed by a control message transmission component as described with reference to FIGS. 9 through 12.

At 1615, the base station may communicate, based on the association between the one or more CORESETs and the one or more PCIs, with the UE according to one or more parameters associated with the one or more PCIs. The operations of 1615 may be performed according to the methods described herein. In some examples, aspects of the operations of 1615 may be performed by a base station PCI communication component as described with reference to FIGS. 9 through 12.

Figure 17:
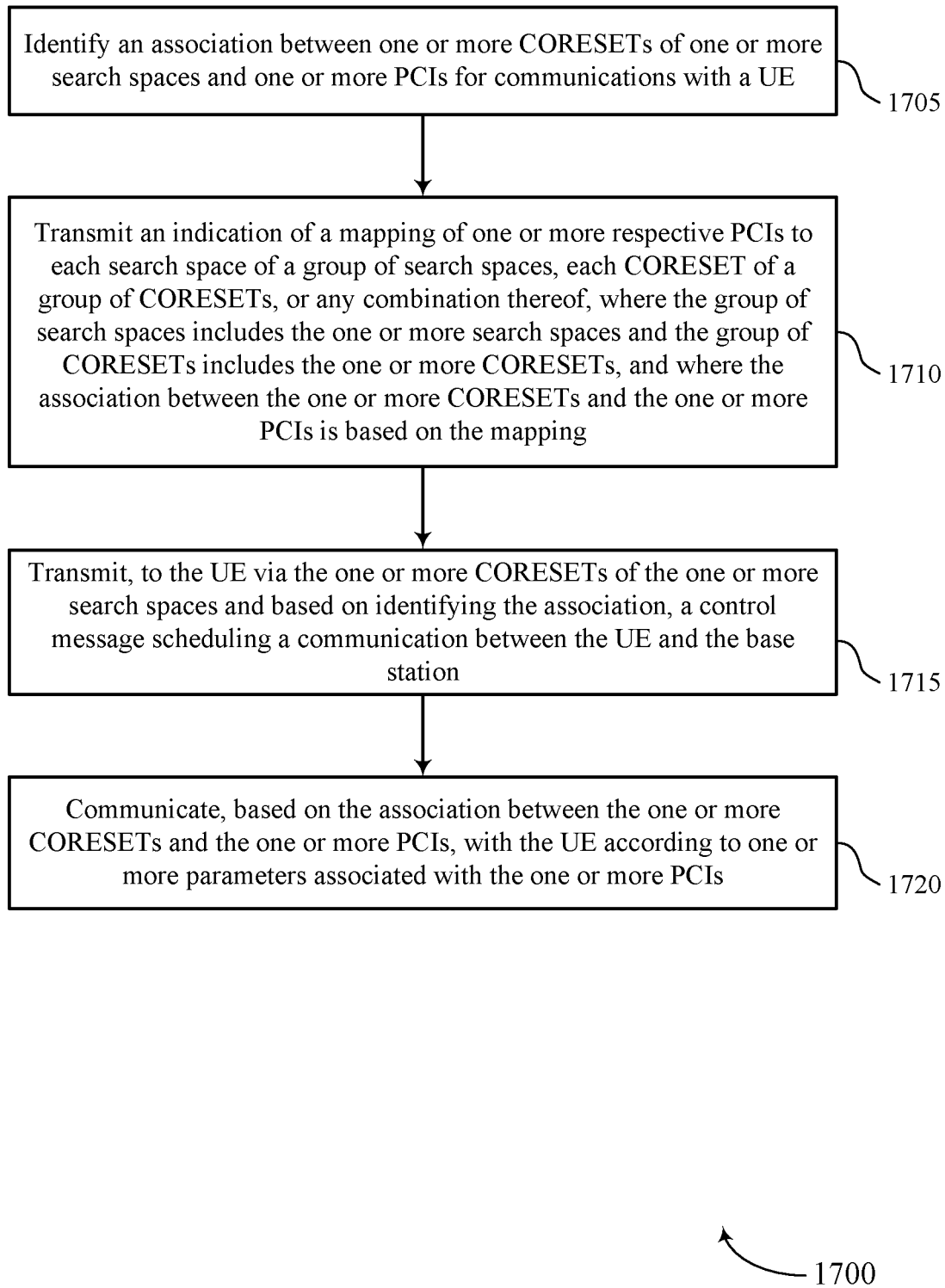

FIG. 17 shows a flowchart illustrating a method 1700 that supports mapping a control resource to a physical cell in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify an association between one or more CORESETs of one or more search spaces and one or more PCIs for communications with a UE. The operations of 1705 may be performed according to the methods described herein. In some examples, aspects of the operations of 1705 may be performed by a base station association identification component as described with reference to FIGS. 9 through 12.

At 1710, the base station may transmit an indication of a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where the association between the one or more CORESETs and the one or more PCIs is based on the mapping. The operations of 1710 may be performed according to the methods described herein. In some examples, aspects of the operations of 1710 may be performed by a mapping transmission component as described with reference to FIGS. 9 through 12.

At 1715, the base station may transmit, to the UE via the one or more CORESETs of the one or more search spaces and based on identifying the association, a control message scheduling a communication between the UE and the base station. The operations of 1715 may be performed according to the methods described herein. In some examples, aspects of the operations of 1715 may be performed by a control message transmission component as described with reference to FIGS. 9 through 12.

At 1720, the base station may communicate, based on the association between the one or more CORESETs and the one or more PCIs, with the UE according to one or more parameters associated with the one or more PCIs. The operations of 1720 may be performed according to the methods described herein. In some examples, aspects of the operations of 1720 may be performed by a base station PCI communication component as described with reference to FIGS. 9 through 12.

Figure 18:
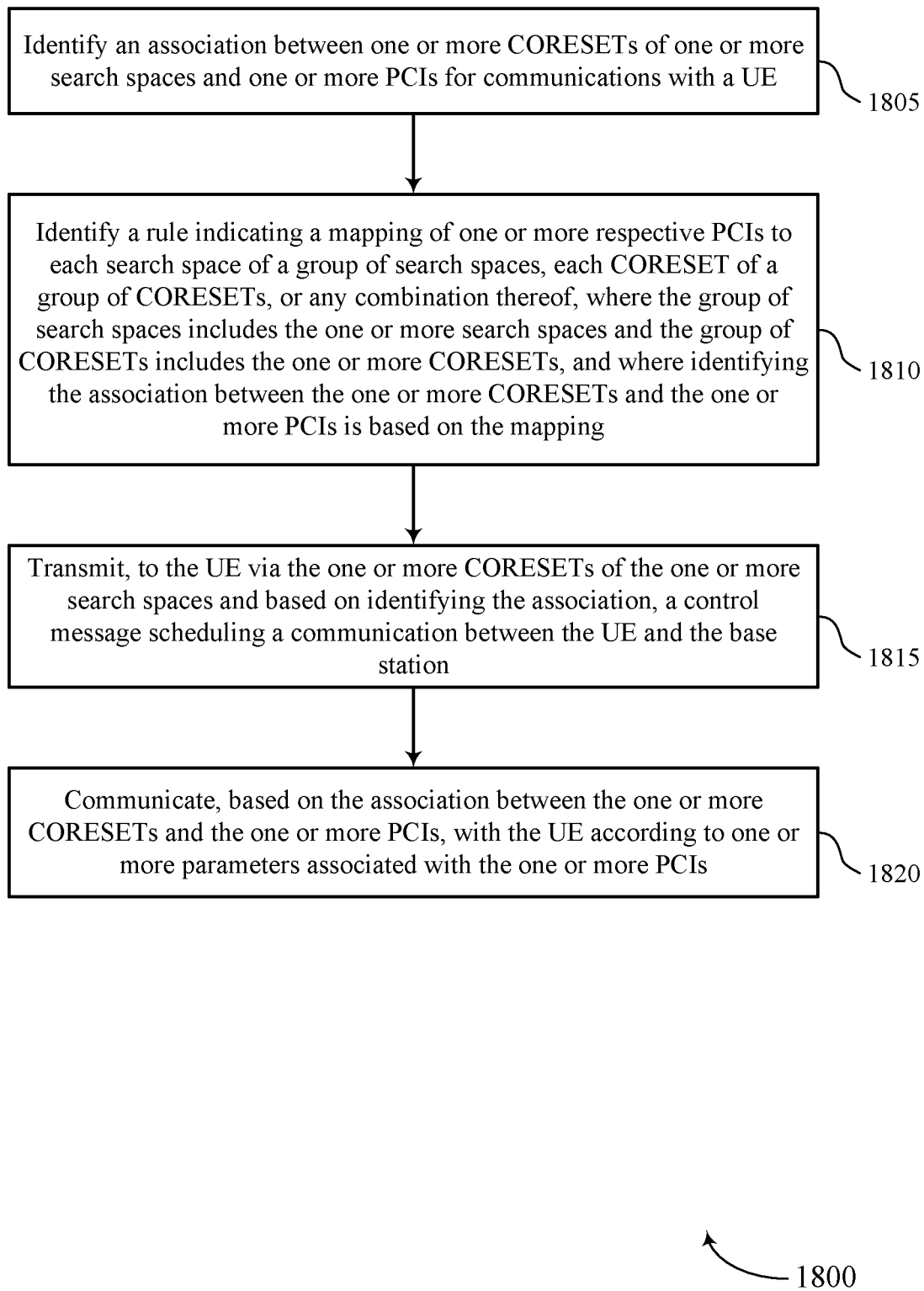

FIG. 18 shows a flowchart illustrating a method 1800 that supports mapping a control resource to a physical cell in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify an association between one or more CORESETs of one or more search spaces and one or more PCIs for communications with a UE. The operations of 1805 may be performed according to the methods described herein. In some examples, aspects of the operations of 1805 may be performed by a base station association identification component as described with reference to FIGS. 9 through 12.

At 1810, the base station may identify a rule indicating a mapping of one or more respective PCIs to each search space of a group of search spaces, each CORESET of a group of CORESETs, or any combination thereof, where the group of search spaces includes the one or more search spaces and the group of CORESETs includes the one or more CORESETs, and where identifying the association between the one or more CORESETs and the one or more PCIs is based on the mapping. The operations of 1810 may be performed according to the methods described herein. In some examples, aspects of the operations of 1810 may be performed by a base station mapping identification component as described with reference to FIGS. 9 through 12.

At 1815, the base station may transmit, to the UE via the one or more CORESETs of the one or more search spaces and based on identifying the association, a control message scheduling a communication between the UE and the base station. The operations of 1815 may be performed according to the methods described herein. In some examples, aspects of the operations of 1815 may be performed by a control message transmission component as described with reference to FIGS. 9 through 12.

At 1820, the base station may communicate, based on the association between the one or more CORESETs and the one or more PCIs, with the UE according to one or more parameters associated with the one or more PCIs. The operations of 1820 may be performed according to the methods described herein. In some examples, aspects of the operations of 1820 may be performed by a base station PCI communication component as described with reference to FIGS. 9 through 12.

The following provides an overview of aspects of the present disclosure:

Aspect 1: A method for wireless communication at a UE, comprising: receiving, from a base station via one or more CORESETs of one or more search spaces, a control message scheduling a communication between the UE and the base station; identifying, based at least in part on receiving the control message, an association between the one or more CORESETs of the one or more search spaces and one or more PCIs; and communicating, based at least in part on the association between the one or more CORESETs and the one or more PCIs, with the base station according to one or more parameters associated with the one or more PCIs.

Aspect 2: The method of aspect 1, further comprising: receiving an indication of a mapping of one or more respective PCIs to each search space of a group of search spaces, each CORESET of a group of CORESETs, or any combination thereof, wherein the group of search spaces comprises the one or more search spaces and the group of CORESETs comprises the one or more CORESETs, and wherein identifying the association between the one or more CORESETs and the one or more PCIs is based at least in part on the indication of the mapping.

Aspect 3: The method of aspect 2, wherein receiving the indication of the mapping comprises: receiving an indication of a mapping of the one or more respective PCIs to a respective pool index of each search space of the group of search spaces, a respective pool index of each CORESET of the group of CORESETs, or any combination thereof.

Aspect 4: The method of any of aspects 2 through 3, further comprising: receiving, from the base station, an indication of a change of one or more active PCIs from a first set of active PCIs to a second set of active PCIs comprising the one or more PCIs, wherein the mapping applies to the first set of active PCIs and the second set of active PCIs.

Aspect 5: The method of any of aspects 2 through 4, further comprising: receiving, from the base station, an indication of a second mapping of one or more respective PCIs to each search space of the group of search spaces, each CORESET of the group of CORESETs, or any combination thereof; and receiving an indication of a change of one or more active PCIs from a first set of active PCIs to a second set of active PCIs comprising the one or more PCIs, wherein the second mapping applies to the first set of active PCIs and the mapping applies to the second set of active PCIs.

Aspect 6: The method of aspect 1, further comprising: identifying a rule indicating a mapping of one or more respective PCIs to each search space of a group of search spaces, each CORESET of a group of CORESETs, or any combination thereof, wherein the group of search spaces comprises the one or more search spaces and the group of CORESETs comprises the one or more CORESETs, and wherein identifying the association between the one or more CORESETs and the one or more PCIs is based at least in part on the mapping.

Aspect 7: The method of aspect 6, wherein identifying the rule comprises: identifying a mapping of the one or more respective PCIs to a respective pool index of each search space of the group of search spaces, a respective pool index of each CORESET of the group of CORESETs, or any combination thereof.

Aspect 8: The method of any of aspects 6 through 7, further comprising: identifying a second mapping of one or more respective PCIs to each search space of the group of search spaces, each CORESET of the group of CORESETs, or any combination thereof; and receiving an indication of a change of one or more active PCIs from a first set of active PCIs to a second set of active PCIs comprising the one or more PCIs, wherein the second mapping applies to the first set of active PCIs and the mapping applies to the second set of active PCIs.

Aspect 9: The method of aspect 8, wherein identifying the association between the one or more CORESETs and the one or more PCIs comprises: mapping one or more CORESET indexes, one or more CORESET pool indexes, or any combination thereof to the one or more active PCIs according to a sequence based at least in part on the rule.

Aspect 10: The method of aspect 9, wherein mapping the one or more CORESET indexes, the one or more CORESET pool indexes, or any combination thereof to the one or more active PCIs according to the sequence comprises: pairing one or more respective CORESET indexes, one or more respective CORESET pool indexes, or any combination thereof, in an order from a lowest index to a highest index, with one or more respective active PCIs in an order from a lowest value to a highest value.

Aspect 11: The method of any of aspects 1 through 10, wherein the one or more parameters associated with the one or more PCIs comprise a bit scrambling technique, a rate matching pattern, one or more beam parameters, or any combination thereof.

Aspect 12: The method of aspect 11, wherein communicating with the base station according to the one or more parameters associated with the one or more PCIs comprises: determining that the bit scrambling technique associated with the one or more PCIs comprises an input for a shared channel for the communication; and applying the bit scrambling technique to the shared channel based at least in part on determining that the bit scrambling technique associated with the one or more PCIs comprises the input.

Aspect 13: The method of any of aspects 11 through 12, wherein communicating with the base station according to the one or more parameters associated with the one or more PCIs comprises: applying the rate matching pattern associated with the one or more PCIs to a shared channel carrying the communication, wherein each of a group of PCIs including the one or more PCIs is associated with a different rate matching pattern.

Aspect 14: The method of any of aspects 1 through 13, comprising: communicating with the base station via a subset of a plurality of TRPs of a serving cell that are each associated with a respective PCI, wherein the one or more PCIs correspond to one or more TRPs of the subset.

Aspect 15: The method of any of aspects 1 through 14, comprising: communicating with the base station via a subset of a plurality of serving cells that are each associated with a respective PCI, wherein the one or more PCIs correspond to one or more serving cells of the subset.

Aspect 16: The method of any of aspects 1 through 15, wherein the one or more PCIs are indicated via physical layer signaling, MAC signaling, or any combination thereof.

Aspect 17: A method for wireless communication at a base station, comprising: identifying an association between one or more CORESETs of one or more search spaces and one or more PCIs for communications with a UE; transmitting, to the UE via the one or more CORESETs of the one or more search spaces and based at least in part on identifying the association, a control message scheduling a communication between the UE and the base station; and communicating, based at least in part on the association between the one or more CORESETs and the one or more PCIs, with the UE according to one or more parameters associated with the one or more PCIs.

Aspect 18: The method of aspect 17, further comprising: transmitting an indication of a mapping of one or more respective PCIs to each search space of a group of search spaces, each CORESET of a group of CORESETs, or any combination thereof, wherein the group of search spaces comprises the one or more search spaces and the group of CORESETs comprises the one or more CORESETs, and wherein the association between the one or more CORESETs and the one or more PCIs is based at least in part on the mapping.

Aspect 19: The method of aspect 18, wherein transmitting the indication of the mapping comprises: transmitting an indication of a mapping of the one or more respective PCIs to a respective pool index of each search space of the group of search spaces, a respective pool index of each CORESET of the group of CORESETs, or any combination thereof.

Aspect 20: The method of any of aspects 18 through 19, further comprising: transmitting, to the UE, an indication of a change of one or more active PCIs from a first set of active PCIs to a second set of active PCIs comprising the one or more PCIs, wherein the mapping applies to the first set of active PCIs and the second set of active PCIs.

Aspect 21: The method of any of aspects 18 through 20, further comprising: transmitting, to the UE, an indication of a second mapping of one or more respective PCIs to each search space of the group of search spaces, each CORESET of the group of CORESETs, or any combination thereof; and transmitting an indication of a change of one or more active PCIs from a first set of active PCIs to a second set of active PCIs comprising the one or more PCIs, wherein the second mapping applies to the first set of active PCIs and the mapping applies to the second set of active PCIs.

Aspect 22: The method of aspect 17, further comprising: identifying a rule indicating a mapping of one or more respective PCIs to each search space of a group of search spaces, each CORESET of a group of CORESETs, or any combination thereof, wherein the group of search spaces comprises the one or more search spaces and the group of CORESETs comprises the one or more CORESETs, and wherein identifying the association between the one or more CORESETs and the one or more PCIs is based at least in part on the mapping.

Aspect 23: The method of aspect 22, wherein identifying the rule comprises: identifying a mapping of the one or more respective PCIs to a respective pool index of each search space of the group of search spaces, a respective pool index of each CORESET of the group of CORESETs, or any combination thereof.

Aspect 24: The method of any of aspects 22 through 23, further comprising: identifying a second mapping of one or more respective PCIs to each search space of the group of search spaces, each CORESET of the group of CORESETs, or any combination thereof; and transmitting an indication of a change of one or more active PCIs from a first set of active PCIs to a second set of active PCIs comprising the one or more PCIs, wherein the second mapping applies to the first set of active PCIs and the mapping applies to the second set of active PCIs.

Aspect 25: The method of aspect 24, wherein identifying the association between the one or more CORESETs and the one or more PCIs comprises: mapping one or more CORESET indexes, one or more CORESET pool indexes, or any combination thereof to the one or more active PCIs according to a sequence based at least in part on the rule.

Aspect 26: The method of aspect 25, wherein mapping the one or more CORESET indexes, the one or more CORESET pool indexes, or any combination thereof to the one or more active PCIs according to the sequence comprises: pairing one or more respective CORESET indexes, one or more respective CORESET pool indexes, or any combination thereof, in an order from a lowest index to a highest index, with one or more respective active PCIs in an order from a lowest value to a highest value.

Aspect 27: The method of any of aspects 17 through 26, wherein the one or more parameters associated with the one or more PCIs comprise a bit scrambling technique, a rate matching pattern, one or more beam parameters, or any combination thereof.

Aspect 28: The method of aspect 27, wherein communicating with the UE according to the one or more parameters associated with the one or more PCIs comprises: determining that the bit scrambling technique associated with the one or more PCIs comprises an input for a shared channel for the communication; and applying the bit scrambling technique to the shared channel based at least in part on determining that the bit scrambling technique associated with the one or more PCIs comprises the input.

Aspect 29: The method of any of aspects 27 through 28, wherein communicating with the UE according to the one or more parameters associated with the one or more PCIs comprises: applying the rate matching pattern associated with the one or more PCIs to a shared channel carrying the communication, wherein each of a group of PCIs including the one or more PCIs is associated with a different rate matching pattern.

Aspect 30: The method of any of aspects 17 through 29, comprising: communicating with the UE via a subset of a plurality of TRPs of a serving cell that are each associated with a respective PCI, wherein the one or more PCIs correspond to one or more TRPs of the subset.

Aspect 31: The method of any of aspects 17 through 30, comprising: communicating with the UE via a subset of a plurality of serving cells that are each associated with a respective PCI, wherein the one or more PCIs correspond to one or more serving cells of the subset.

Aspect 32: The method of any of aspects 17 through 31, wherein the one or more PCIs are indicated via physical layer signaling, MAC signaling, or any combination thereof.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communication at a base station, comprising a processor; memory coupled with the processor; and instructions stored in the memory and executable by the processor to cause the apparatus to perform a method of any of aspects 17 through 32.

Aspect 37: An apparatus for wireless communication at a base station, comprising at least one means for performing a method of any of aspects 17 through 32.

Aspect 38: A non-transitory computer-readable medium storing code for wireless communication at a base station, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
  receiving an indication of a mapping of one or more respective physical cell identifiers to each search space of a group of search spaces, each control resource set of a group of control resource sets, or any combination thereof, wherein the group of search spaces comprises a search space and the group of control resource sets comprises a control resource set of the search space;
  receiving, via the control resource set of the search space, a control message scheduling a communication between the UE and a network device, wherein the control message lacks an indication of the one or more physical cell identifiers;
  identifying, based at least in part on the indication of the mapping and the control resource set in which the control message is received, an association between the control resource set of the search space, with a corresponding pool index, and the one or more physical cell identifiers; and communicating, based at least in part on the association between the control resource set, the corresponding pool index, and the one or more physical cell identifiers, with the network device according to one or more parameters associated with the one or more physical cell identifiers.

2. The method of claim 1, wherein receiving the indication of the mapping comprises:

receiving an indication of a mapping of the one or more respective physical cell identifiers to a respective pool index of each search space of the group of search spaces, a respective pool index of each control resource set of the group of control resource sets, or both.

3. The method of claim 1, further comprising:

receiving an indication of a change of one or more active physical cell identifiers from a first set of active physical cell identifiers to a second set of active physical cell identifiers comprising the one or more physical cell identifiers, wherein the mapping applies to the first set of active physical cell identifiers and the second set of active physical cell identifiers.

4. The method of claim 1, further comprising:

receiving an indication of a second mapping of the one or more respective physical cell identifiers to each search space of the group of search spaces, each control resource set of the group of control resource sets, or any combination thereof; and receiving an indication of a change of one or more active physical cell identifiers from a first set of active physical cell identifiers to a second set of active physical cell identifiers comprising the one or more physical cell identifiers, wherein the second mapping applies to the first set of active physical cell identifiers and the mapping applies to the second set of active physical cell identifiers.

5. The method of claim 1, further comprising:

identifying a rule indicating the mapping of the one or more respective physical cell identifiers to each search space of the group of search spaces, each control resource set of the group of control resource sets, or any combination thereof, wherein the group of search spaces comprises the search space and the group of control resource sets comprises the control resource set, and wherein identifying the association between the control resource set and the one or more physical cell identifiers is based at least in part on the mapping.

6. The method of claim 5, wherein identifying the rule comprises:

identifying a second mapping of the one or more respective physical cell identifiers to a respective pool index of each search space of the group of search spaces, a respective pool index of each control resource set of the group of control resource sets, or any combination thereof.

7. The method of claim 5, further comprising:

identifying a second mapping of the one or more respective physical cell identifiers to each search space of the group of search spaces, each control resource set of the group of control resource sets, or any combination thereof; and receiving an indication of a change of one or more active physical cell identifiers from a first set of active physical cell identifiers to a second set of active physical cell identifiers comprising the one or more physical cell identifiers, wherein the second mapping applies to the first set of active physical cell identifiers and the mapping applies to the second set of active physical cell identifiers.

8. The method of claim 7, wherein identifying the association between the control resource set and the one or more physical cell identifiers comprises:

mapping one or more control resource set indexes, one or more control resource set pool indexes, or any combination thereof to the one or more active physical cell identifiers according to a sequence based at least in part on the rule.

9. The method of claim 8, wherein mapping the one or more control resource set indexes, the one or more control resource set pool indexes, or any combination thereof to the one or more active physical cell identifiers according to the sequence comprises:

pairing one or more respective control resource set indexes, one or more respective control resource set pool indexes, or any combination thereof, in an order from a lowest index to a highest index, with one or more respective active physical cell identifiers in an order from a lowest value to a highest value.

10. The method of claim 1, wherein the one or more parameters associated with the one or more physical cell identifiers comprise a bit scrambling technique, a rate matching pattern, one or more beam parameters, or any combination thereof.

11. The method of claim 10, wherein communicating with the network device according to the one or more parameters associated with the one or more physical cell identifiers comprises:

determining that the bit scrambling technique associated with the one or more physical cell identifiers comprises an input for a shared channel for the communication; and applying the bit scrambling technique to the shared channel based at least in part on determining that the bit scrambling technique associated with the one or more physical cell identifiers comprises the input.

12. The method of claim 10, wherein communicating with the network device according to the one or more parameters associated with the one or more physical cell identifiers comprises:

applying the rate matching pattern associated with the one or more physical cell identifiers to a shared channel carrying the communication, wherein each of a group of physical cell identifiers including the one or more physical cell identifiers is associated with a different rate matching pattern.

13. The method of claim 1, comprising:

communicating with the network device via a subset of a plurality of transmission and reception points of a serving cell that are each associated with a respective physical cell identifier, wherein the one or more physical cell identifiers correspond to one or more transmission and reception points of the subset.

14. The method of claim 1, comprising:

communicating with the network device via a subset of a plurality of serving cells that are each associated with a respective physical cell identifier, wherein the one or more physical cell identifiers correspond to one or more serving cells of the subset.

15. A method for wireless communication at a network device, comprising:

transmitting an indication of a mapping of one or more respective physical cell identifiers to each search space of a group of search spaces, each control resource set of a group of control resource sets, or any combination thereof, wherein the group of search spaces comprises a search space and the group of control resource sets comprises a control resource set of the search space;
identifying an association between the control resource set of the search space, with a corresponding pool index, and the one or more physical cell identifiers for communications with a user equipment (UE) based at least in part on the indication of the mapping and the control resource set in which a control message is to be transmitted;
transmitting, via the control resource set of the search space and based at least in part on identifying the association, the control message scheduling a communication between the UE and the network device, wherein the control message lacks an indication of the one or more physical cell identifiers; and
communicating, based at least in part on the association between the control resource set, the corresponding pool index, and the one or more physical cell identifiers, with the UE according to one or more parameters associated with the one or more physical cell identifiers.

16. The method of claim 15, wherein transmitting the indication of the mapping comprises:
transmitting an indication of a mapping of the one or more respective physical cell identifiers to a respective pool index of each search space of the group of search spaces, a respective pool index of each control resource set of the group of control resource sets, or both.

17. The method of claim 15, further comprising:
transmitting an indication of a change of one or more active physical cell identifiers from a first set of active physical cell identifiers to a second set of active physical cell identifiers comprising the one or more physical cell identifiers, wherein the mapping applies to the first set of active physical cell identifiers and the second set of active physical cell identifiers.

18. The method of claim 15, further comprising:
transmitting an indication of a second mapping of the one or more respective physical cell identifiers to each search space of the group of search spaces, each control resource set of the group of control resource sets, or any combination thereof; and
transmitting an indication of a change of one or more active physical cell identifiers from a first set of active physical cell identifiers to a second set of active physical cell identifiers comprising the one or more physical cell identifiers, wherein the second mapping applies to the first set of active physical cell identifiers and the mapping applies to the second set of active physical cell identifiers.

19. The method of claim 15, further comprising:
identifying a rule indicating the mapping of the one or more respective physical cell identifiers to each search space of the group of search spaces, each control resource set of the group of control resource sets, or any combination thereof, wherein the group of search spaces comprises the search space and the group of control resource sets comprises the control resource set, and wherein identifying the association between the control resource set and the one or more physical cell identifiers is based at least in part on the mapping.

20. The method of claim 19, wherein identifying the rule comprises:
identifying a second mapping of the one or more respective physical cell identifiers to a respective pool index of each search space of the group of search spaces, a respective pool index of each control resource set of the group of control resource sets, or any combination thereof.

21. The method of claim 19, further comprising:
identifying a second mapping of the one or more respective physical cell identifiers to each search space of the group of search spaces, each control resource set of the group of control resource sets, or any combination thereof; and
transmitting an indication of a change of one or more active physical cell identifiers from a first set of active physical cell identifiers to a second set of active physical cell identifiers comprising the one or more physical cell identifiers, wherein the second mapping applies to the first set of active physical cell identifiers and the mapping applies to the second set of active physical cell identifiers.

22. The method of claim 21, wherein identifying the association between the control resource set and the one or more physical cell identifiers comprises:
mapping one or more control resource set indexes, one or more control resource set pool indexes, or any combination thereof to the one or more active physical cell identifiers according to a sequence based at least in part on the rule.

23. The method of claim 22, wherein mapping the one or more control resource set indexes, the one or more control resource set pool indexes, or any combination thereof to the one or more active physical cell identifiers according to the sequence comprises:
pairing one or more respective control resource set indexes, one or more respective control resource set pool indexes, or any combination thereof, in an order from a lowest index to a highest index, with one or more respective active physical cell identifiers in an order from a lowest value to a highest value.

24. The method of claim 15, wherein communicating with the UE according to the one or more parameters associated with the one or more physical cell identifiers comprises:
determining that a bit scrambling technique associated with the one or more physical cell identifiers comprises an input for a shared channel for the communication, the one or more parameters associated with the one or more physical cell identifiers comprising the bit scrambling technique; and
applying the bit scrambling technique to the shared channel based at least in part on determining that the bit scrambling technique associated with the one or more physical cell identifiers comprises the input.

25. The method of claim 15, comprising:
communicating with the UE via a subset of a plurality of transmission and reception points of a serving cell that are each associated with a respective physical cell identifier, wherein the one or more physical cell identifiers correspond to one or more transmission and reception points of the subset.

26. The method of claim 15, comprising:
communicating with the UE via a subset of a plurality of serving cells that are each associated with a respective physical cell identifier, wherein the one or more physical cell identifiers correspond to one or more serving cells of the subset.

27. An apparatus for wireless communication at a user equipment (UE), comprising:

a processor;
memory coupled with the processor; and
instructions stored in the memory and executable by the processor to cause the apparatus to:
  receive an indication of a mapping of one or more respective physical cell identifiers to each search space of a group of search spaces, each control resource set of a group of control resource sets, or any combination thereof, wherein the group of search spaces comprises a search space and the group of control resource sets comprises a control resource set of the search space;
  receive, via the control resource set of the search space, a control message scheduling a communication between the UE and a network device, wherein the control message lacks an indication of the one or more physical cell identifiers;
  identify, based at least in part on the indication of the mapping and the control resource set in which the control message is received, an association between the control resource set of the search space, with a corresponding pool index, and the one or more physical cell identifiers; and
  communicate, based at least in part on the association between the control resource set, the corresponding pool index, and the one or more physical cell identifiers, with the network device according to one or more parameters associated with the one or more physical cell identifiers.

28. An apparatus for wireless communication at a network device, comprising:
a processor;
memory coupled with the processor; and
instructions stored in the memory and executable by the processor to cause the apparatus to:
  receive an indication of a mapping of one or more respective physical cell identifiers to each search space of a group of search spaces, each control resource set of a group of control resource sets, or any combination thereof, wherein the group of search spaces comprises a search space and the group of control resource sets comprises a control resource set of the search space;
  identify an association between the control resource set of the search space, with a corresponding pool index, and the one or more physical cell identifiers for communications with a user equipment (UE) based at least in part on the indication of the mapping and the control resource set in which a control message is to be transmitted;
  transmit, via the control resource set of the search space and based at least in part on identifying the association, the control message scheduling a communication between the UE and the network device, wherein the control message excluding lacks an indication of the one or more physical cell identifiers; and
  communicate, based at least in part on the association between the control resource set, the corresponding pool index, and the one or more physical cell identifiers, with the UE according to one or more parameters associated with the one or more physical cell identifiers.

* * * * *